US012761480B2

(12) United States Patent
Hoover et al.

(10) Patent No.: US 12,761,480 B2
(45) Date of Patent: *Oct. 13, 2026

(54) AUTOMATIC PLACEMENT OF A VIRTUAL OBJECT IN A THREE-DIMENSIONAL SPACE

(71) Applicant: Magic Leap, Inc., Plantation, FL (US)

(72) Inventors: Paul Armistead Hoover, Bothell, WA (US); Jonathan Lawrence Mann, Seattle, WA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,017

(22) Filed: Sep. 22, 2023

(65) Prior Publication Data

US 2024/0012252 A1 Jan. 11, 2024

Related U.S. Application Data

(63) Continuation of application No. 17/679,774, filed on Feb. 24, 2022, now Pat. No. 11,808,944, which is a (Continued)

(51) Int. Cl.
*G02B 27/01* (2006.01)
*G02B 30/34* (2020.01)
(Continued)

(52) U.S. Cl.
CPC ....... *G02B 27/0172* (2013.01); *G02B 27/017* (2013.01); *G02B 27/0189* (2013.01); (Continued)

(58) Field of Classification Search
CPC ...... G06F 3/04815; G06F 3/011; G06F 3/012; G06F 3/013; G06T 19/006; G06T 19/20; (Continued)

(56) References Cited

U.S. PATENT DOCUMENTS 5,590,268 A 12/1996 Doi et al.
5,689,628 A 11/1997 Robertson
(Continued)

FOREIGN PATENT DOCUMENTS

CN 1547131 A 11/2004
CN 1746821 A 3/2006
(Continued)

OTHER PUBLICATIONS

Dana Slambekova et al, "Gaze and gesture based object manipulation in virtual worlds", Virtual Reality Software and Technology, ACM, 2 Penn Plaza, Suite 701 New York NY 10121-0701 USA, (Dec. 10, 2012), doi:10.1145/2407336.2407380, ISBN 978-1-4503-1469-5, pp. 203-204.
(Continued)

*Primary Examiner* — William A Beutel
(74) *Attorney, Agent, or Firm* — KLINTWORTH & ROZENBLAT LLP

(57) ABSTRACT

Augmented reality systems and methods for automatically repositioning a virtual object with respect to a destination object in a three-dimensional (3D) environment of a user are disclosed. The systems and methods can automatically attach the target virtual object to the destination object and re-orient the target virtual object based on the affordances of the virtual object or the destination object. The systems and methods can also track the movement of a user and detach the virtual object from the destination object when the user's movement passes a threshold condition.

20 Claims, 19 Drawing Sheets

Related U.S. Application Data continuation of application No. 17/144,574, filed on Jan. 8, 2021, now Pat. No. 11,287,659, which is a continuation of application No. 16/821,653, filed on Mar. 17, 2020, now Pat. No. 10,921,599, which is a continuation of application No. 15/673,135, filed on Aug. 9, 2017, now Pat. No. 10,627,625.

(60) Provisional application No. 62/373,693, filed on Aug. 11, 2016, provisional application No. 62/373,692, filed on Aug. 11, 2016.

(51) Int. Cl.

| | |
|---|---|
| ***G06F 3/01*** | (2006.01) |
| ***G06F 3/04815*** | (2022.01) |
| ***G06T 19/00*** | (2011.01) |
| ***G06T 19/20*** | (2011.01) |
| ***H04N 13/156*** | (2018.01) |
| ***H04N 13/239*** | (2018.01) |
| ***H04N 13/279*** | (2018.01) |
| ***H04N 13/344*** | (2018.01) |
| ***H04N 13/395*** | (2018.01) |

(52) U.S. Cl.

CPC .............. *G02B 30/34* (2020.01); *G06F 3/011* (2013.01); *G06F 3/012* (2013.01); *G06F 3/013* (2013.01); *G06F 3/04815* (2013.01); *G06T 19/006* (2013.01); *G06T 19/20* (2013.01); *H04N 13/156* (2018.05); *H04N 13/239* (2018.05); *H04N 13/279* (2018.05); *H04N 13/344* (2018.05); *H04N 13/395* (2018.05); *G02B 2027/0138* (2013.01); *G02B 2027/014* (2013.01); *G02B 2027/0178* (2013.01); *G02B 2027/0187* (2013.01); *H04N 2213/001* (2013.01)

(58) Field of Classification Search

CPC .. H04N 13/279; H04N 13/156; H04N 13/239; H04N 13/344; H04N 13/395; H04N 2213/001; G02B 27/0172; G02B 27/017; G02B 27/0189; G02B 30/34; G02B 2027/0138; G02B 2027/014; G02B 2027/0178; G02B 2027/0187

See application file for complete search history.

(56) References Cited

U.S. PATENT DOCUMENTS 5,952,993 A 9/1999 Matsuda et al.
6,396,509 B1 5/2002 Cheng
6,532,007 B1 3/2003 Matsuda
6,771,294 B1 8/2004 Pulli et al.
6,850,221 B1 2/2005 Tickle
6,885,363 B2 4/2005 Smith
D514,570 S 2/2006 Ohta
7,457,733 B2 11/2008 Maille et al.
7,564,476 B1 7/2009 Coughlan et al.
7,834,846 B1 11/2010 Bell
D658,094 S 4/2012 Dunn
8,458,603 B2 6/2013 Finn et al.
8,466,931 B2 6/2013 Finn et al.
8,531,355 B2 9/2013 Maltz
8,593,510 B2 11/2013 Yoo et al.
8,854,433 B1 10/2014 Rafii
8,950,867 B2 2/2015 Macnamara
9,064,023 B2 6/2015 Hyndman
9,081,426 B2 7/2015 Armstrong
9,104,312 B2 8/2015 Kay et al.
9,122,053 B2 9/2015 Geisner et al.
9,147,282 B1 9/2015 Cote et al.
9,176,579 B2 11/2015 Hyndman et al.
9,195,306 B2 11/2015 Gomez
9,202,313 B2 12/2015 Bennet et al.
9,215,293 B2 12/2015 Miller
D752,529 S 3/2016 Loretan et al.
9,292,973 B2 3/2016 Bar-Zeev et al.
9,310,559 B2 4/2016 Macnamara
9,310,611 B2 4/2016 Forutanpour et al.
9,319,632 B2 4/2016 Kim et al.
9,348,143 B2 5/2016 Gao et al.
D758,367 S 6/2016 Natsume
D759,657 S 6/2016 Kujawski et al.
9,360,933 B2 6/2016 Anderson et al.
9,384,594 B2 7/2016 Maciocci et al.
9,417,452 B2 8/2016 Schowengerdt et al.
9,437,170 B1 9/2016 Quevedo
9,470,906 B2 10/2016 Kaji et al.
9,547,174 B2 1/2017 Gao et al.
9,645,397 B2 5/2017 da Veiga et al.
9,671,566 B2 6/2017 Abovitz et al.
D794,288 S 8/2017 Beers et al.
9,740,006 B2 8/2017 Gao
9,791,700 B2 10/2017 Schowengerdt
D805,734 S 12/2017 Fisher et al.
9,851,563 B2 12/2017 Gao et al.
9,857,591 B2 1/2018 Welch et al.
9,874,749 B2 1/2018 Bradski et al.
9,928,661 B1 * 3/2018 Kinstner ................. A63F 13/20
9,984,510 B1 5/2018 Kinstner et al.
9,990,774 B2 6/2018 Mao
10,078,919 B2 9/2018 Powderly et al.
10,203,762 B2 2/2019 Bradski et al.
10,417,831 B2 9/2019 Powderly et al.
10,466,794 B2 11/2019 Maeda et al.
10,510,191 B2 12/2019 Powderly et al.
10,521,025 B2 12/2019 Powderly et al.
10,627,625 B2 4/2020 Hoover et al.
10,629,003 B2 4/2020 Miller et al.
10,681,489 B2 6/2020 Mangiat et al.
10,733,806 B2 8/2020 Powderly et al.
10,768,693 B2 9/2020 Powderly et al.
10,838,484 B2 11/2020 Naples et al.
10,921,599 B2 2/2021 Hoover et al.
11,049,328 B2 6/2021 Powderly et al.
11,175,750 B2 11/2021 Powderly et al.
11,237,623 B2 2/2022 Powderly et al.
11,287,659 B2 3/2022 Hoover et al.
11,328,484 B2 5/2022 Powderly et al.
11,340,694 B2 5/2022 Naples et al.
11,507,204 B2 11/2022 Powderly et al.
11,657,579 B2 5/2023 Powderly et al.
2003/0169398 A1 9/2003 Perrott et al.
2003/0210227 A1 11/2003 Smith
2004/0113885 A1 6/2004 Genc et al.
2004/0164956 A1 * 8/2004 Yamaguchi ......... G06F 3/04845
345/156
2005/0096889 A1 5/2005 Maille et al.
2005/0275626 A1 12/2005 Mueller et al.
2006/0007304 A1 1/2006 Anderson
2006/0028436 A1 2/2006 Armstrong
2006/0183546 A1 8/2006 Addington et al.
2006/0197832 A1 9/2006 Yamada et al.
2007/0081123 A1 4/2007 Lewis
2007/0191112 A1 8/2007 Ohta
2007/0197287 A1 8/2007 Shimizu
2008/0211771 A1 9/2008 Richardson
2009/0066725 A1 3/2009 Nogami et al.
2009/0293012 A1 11/2009 Alter et al.
2010/0020080 A1 1/2010 Iwanaga
2010/0100509 A1 4/2010 Johnston et al.
2010/0123588 A1 5/2010 Cruz Hernandez
2010/0125799 A1 5/2010 Roberts et al.
2010/0153868 A1 6/2010 Allen et al.
2010/0177117 A1 7/2010 Finn et al.
2010/0240988 A1 9/2010 Varga et al.
2010/0265182 A1 10/2010 Ball et al.
2010/0325572 A1 12/2010 Morris et al.
2011/0063286 A1 3/2011 Roberts et al.
2011/0122130 A1 5/2011 Vesely et al.
2011/0141043 A1 6/2011 Soubrie

(56) References Cited

U.S. PATENT DOCUMENTS

2011/0161060 A1 6/2011 Kim et al.
2011/0191707 A1 8/2011 Lee et al.
2012/0002286 A1 1/2012 Tanikawa
2012/0013613 A1 1/2012 Vesely
2012/0022865 A1 1/2012 Milstein
2012/0056992 A1 3/2012 Kuroda
2012/0075343 A1 3/2012 Chen et al.
2012/0105486 A1 5/2012 Lankford et al.
2012/0113092 A1 5/2012 Bar-Zeev et al.
2012/0113223 A1 5/2012 Hilliges et al.
2012/0127062 A1 5/2012 Bar-Zeev et al.
2012/0127284 A1 5/2012 Bar-Zeev et al.
2012/0162549 A1 6/2012 Gao et al.
2012/0206452 A1 8/2012 Geisner et al.
2012/0210255 A1* 8/2012 Ooi ........................ G06T 19/006 715/762
2012/0249416 A1 10/2012 Maciocci et al.
2012/0249590 A1 10/2012 Maciocci et al.
2012/0249741 A1* 10/2012 Maciocci .............. G06T 19/006 348/51
2012/0264510 A1 10/2012 Wigdor et al.
2012/0320080 A1 12/2012 Giese et al.
2013/0013229 A1 1/2013 Norieda et al.
2013/0044128 A1 2/2013 Liu et al.
2013/0046544 A1 2/2013 Kay et al.
2013/0073192 A1 3/2013 Hota et al.
2013/0082922 A1 4/2013 Miller
2013/0104085 A1 4/2013 Mlyniec et al.
2013/0117377 A1 5/2013 Miller
2013/0125027 A1 5/2013 Abovitz
2013/0155106 A1* 6/2013 Rolleston .............. G06T 19/006 345/633
2013/0174213 A1 7/2013 Liu et al.
2013/0208234 A1 8/2013 Lewis
2013/0215109 A1 8/2013 Miesnieks et al.
2013/0215230 A1 8/2013 Miesnieks et al.
2013/0219302 A1 8/2013 Tytgat et al.
2013/0235029 A1 9/2013 Keough et al.
2013/0242262 A1 9/2013 Lewis
2013/0246967 A1* 9/2013 Wheeler ................. G06F 3/012 715/784
2013/0285885 A1 10/2013 Nowatzyk et al.
2013/0300740 A1 11/2013 Snyder et al.
2013/0321268 A1 12/2013 Tuck et al.
2013/0328925 A1 12/2013 Latta et al.
2014/0002351 A1 1/2014 Nakayama
2014/0003762 A1 1/2014 Macnamara
2014/0035959 A1 2/2014 Lapstun
2014/0063060 A1 3/2014 Maciocci et al.
2014/0071539 A1 3/2014 Gao
2014/0078175 A1 3/2014 Forutanpour et al.
2014/0125574 A1 5/2014 Scavezze et al.
2014/0129990 A1 5/2014 Xin et al.
2014/0132633 A1* 5/2014 Fekete ................... G06Q 50/01 345/634
2014/0152558 A1 6/2014 Salter et al.
2014/0160157 A1 6/2014 Poulos et al.
2014/0168056 A1 6/2014 Swaminathan et al.
2014/0168261 A1 6/2014 Margolis et al.
2014/0168262 A1 6/2014 Forutanpour et al.
2014/0176607 A1 6/2014 Yang et al.
2014/0177023 A1 6/2014 Gao et al.
2014/0184588 A1 7/2014 Cheng et al.
2014/0184589 A1 7/2014 Vesely
2014/0191872 A1 7/2014 Gomi et al.
2014/0201674 A1 7/2014 Holz
2014/0204002 A1 7/2014 Bennet et al.
2014/0218468 A1 8/2014 Gao et al.
2014/0237366 A1 8/2014 Poulos et al.
2014/0240351 A1 8/2014 Scavezze et al.
2014/0258942 A1 9/2014 Kutliroff et al.
2014/0267228 A1 9/2014 Ofek et al.
2014/0267411 A1 9/2014 Fein et al.
2014/0267420 A1 9/2014 Schowengerdt et al.
2014/0282162 A1 9/2014 Fein et al.
2014/0292653 A1 10/2014 Kamba et al.
2014/0300565 A1 10/2014 Anderson et al.
2014/0306866 A1 10/2014 Miller et al.
2014/0306891 A1* 10/2014 Latta .................... G02B 27/017 345/158
2014/0306993 A1 10/2014 Poulos et al.
2014/0320389 A1 10/2014 Scavezze et al.
2014/0333666 A1* 11/2014 Poulos .................. G06T 19/006 345/633
2014/0354532 A1 12/2014 Mullins
2014/0364212 A1 12/2014 Osman et al.
2014/0372944 A1 12/2014 Mulcahy et al.
2014/0372957 A1 12/2014 Keane et al.
2014/0375683 A1 12/2014 Salter et al.
2014/0376773 A1 12/2014 Holz
2015/0007114 A1 1/2015 Poulos et al.
2015/0016777 A1 1/2015 Abovitz et al.
2015/0049018 A1 2/2015 Gomez et al.
2015/0052479 A1 2/2015 Ooi et al.
2015/0061992 A1 3/2015 Lamberty
2015/0062003 A1 3/2015 Rafii et al.
2015/0062161 A1 3/2015 Kim et al.
2015/0091941 A1 4/2015 Das et al.
2015/0091943 A1 4/2015 Lee et al.
2015/0103306 A1 4/2015 Kaji et al.
2015/0116354 A1 4/2015 Tomlin et al.
2015/0138081 A1 5/2015 Iwatsu et al.
2015/0161762 A1 6/2015 Fujiwara
2015/0168731 A1 6/2015 Robbins
2015/0178939 A1 6/2015 Bradski et al.
2015/0187357 A1 7/2015 Xia et al.
2015/0193018 A1 7/2015 Venable et al.
2015/0193982 A1 7/2015 Mihelich et al.
2015/0205126 A1 7/2015 Schowengerdt
2015/0205494 A1 7/2015 Scott et al.
2015/0221115 A1 8/2015 Matsubara
2015/0221132 A1 8/2015 Kruglick
2015/0222863 A1 8/2015 Kawakami
2015/0222883 A1 8/2015 Welch
2015/0222884 A1 8/2015 Cheng
2015/0227194 A1 8/2015 Kubota et al.
2015/0227285 A1 8/2015 Lee et al.
2015/0231509 A1 8/2015 Mcmain et al.
2015/0235447 A1 8/2015 Abovitz et al.
2015/0243102 A1 8/2015 Schowengerdt
2015/0243104 A1 8/2015 Schowengerdt
2015/0243106 A1 8/2015 Abovitz et al.
2015/0262424 A1 9/2015 Tabaka et al.
2015/0268415 A1 9/2015 Schowengerdt et al.
2015/0268821 A1* 9/2015 Ramsby ................. G06V 40/19 715/765
2015/0286858 A1 10/2015 Shaburov et al.
2015/0302652 A1 10/2015 Miller et al.
2015/0304645 A1 10/2015 Wilson et al.
2015/0309263 A2 10/2015 Abovitz et al.
2015/0326570 A1 11/2015 Publicover et al.
2015/0338915 A1 11/2015 Publicover et al.
2015/0339468 A1 11/2015 Son et al.
2015/0341626 A1 11/2015 Kim et al.
2015/0346480 A1 12/2015 Chen et al.
2015/0346485 A1 12/2015 Hayakawa et al.
2015/0346490 A1 12/2015 Tekolste et al.
2015/0346495 A1 12/2015 Welch et al.
2015/0355805 A1 12/2015 Chandler et al.
2015/0364140 A1 12/2015 Thörn
2015/0371516 A1 12/2015 Petersen et al.
2015/0378440 A1 12/2015 Umlauf et al.
2016/0011419 A1 1/2016 Gao
2016/0018885 A1 1/2016 Kimura et al.
2016/0026253 A1 1/2016 Bradski et al.
2016/0027217 A1 1/2016 Veiga et al.
2016/0027218 A1 1/2016 Salter et al.
2016/0042566 A1 2/2016 Mao
2016/0050345 A1 2/2016 Longbotham et al.
2016/0055676 A1 2/2016 Kasahara et al.
2016/0070108 A1 3/2016 Nakada et al.
2016/0112631 A1 4/2016 Ackley et al.
2016/0116979 A1 4/2016 Border

(56) References Cited

U.S. PATENT DOCUMENTS

| | | | |
|---|---|---|---|
| 2016/0127624 A1 | 5/2016 | Woo et al. | |
| 2016/0129344 A1 | 5/2016 | Shiina et al. | |
| 2016/0140391 A1 | 5/2016 | Kim et al. | |
| 2016/0148433 A1* | 5/2016 | Petrovskaya .......... | G02B 27/01 345/633 |
| 2016/0178939 A1 | 6/2016 | Cheng et al. | |
| 2016/0179336 A1 | 6/2016 | Ambrus et al. | |
| 2016/0180590 A1 | 6/2016 | Kamhi et al. | |
| 2016/0187974 A1 | 6/2016 | Mallinson | |
| 2016/0188181 A1 | 6/2016 | Smith | |
| 2016/0210276 A1 | 7/2016 | Kawano et al. | |
| 2016/0210784 A1 | 7/2016 | Ramsby et al. | |
| 2016/0246371 A1 | 8/2016 | Mullins | |
| 2016/0246384 A1 | 8/2016 | Mullins et al. | |
| 2016/0253842 A1* | 9/2016 | Shapira ................. | G06T 19/006 345/633 |
| 2016/0343138 A1 | 11/2016 | Chew | |
| 2016/0379408 A1* | 12/2016 | Wright ............... | G02B 27/0172 345/633 |
| 2017/0060230 A1 | 3/2017 | Faaborg et al. | |
| 2017/0068323 A1* | 3/2017 | West ................... | G06F 3/04815 |
| 2017/0078825 A1 | 3/2017 | Mangiat et al. | |
| 2017/0109936 A1 | 4/2017 | Powderly et al. | |
| 2017/0123492 A1 | 5/2017 | Marggraff et al. | |
| 2017/0169621 A1 | 6/2017 | Kawamoto et al. | |
| 2017/0220225 A1 | 8/2017 | Joly et al. | |
| 2017/0221264 A1 | 8/2017 | Perry | |
| 2017/0273436 A1 | 9/2017 | Caulier et al. | |
| 2017/0287218 A1 | 10/2017 | Nuernberger et al. | |
| 2017/0287225 A1 | 10/2017 | Powderly et al. | |
| 2017/0309079 A1 | 10/2017 | Naples et al. | |
| 2017/0323158 A1 | 11/2017 | Gordon | |
| 2017/0337742 A1 | 11/2017 | Powderly et al. | |
| 2018/0045963 A1 | 2/2018 | Hoover et al. | |
| 2018/0098059 A1 | 4/2018 | Valdivia et al. | |
| 2018/0174366 A1 | 6/2018 | Nishibe et al. | |
| 2018/0307303 A1 | 10/2018 | Powderly et al. | |
| 2018/0342151 A1 | 11/2018 | Vanblon et al. | |
| 2018/0357978 A1 | 12/2018 | Liao et al. | |
| 2018/0365901 A1 | 12/2018 | Powderly et al. | |
| 2019/0324634 A1 | 10/2019 | Gao et al. | |
| 2019/0355180 A1 | 11/2019 | Powderly et al. | |
| 2020/0013236 A1 | 1/2020 | Perez et al. | |
| 2020/0042582 A1 | 2/2020 | Maerhufu et al. | |
| 2020/0081555 A1 | 3/2020 | Powderly et al. | |
| 2020/0082637 A1 | 3/2020 | Powderly et al. | |
| 2020/0218074 A1 | 7/2020 | Hoover et al. | |
| 2020/0327737 A1 | 10/2020 | Powderly et al. | |
| 2020/0363865 A1 | 11/2020 | Powderly et al. | |
| 2021/0011546 A1 | 1/2021 | Naples et al. | |
| 2021/0208404 A1 | 7/2021 | Hoover et al. | |
| 2021/0286483 A1 | 9/2021 | Josephson | |
| 2022/0020218 A1 | 1/2022 | Powderly et al. | |
| 2022/0075458 A1 | 3/2022 | Powderly et al. | |
| 2022/0171453 A1 | 6/2022 | Powderly et al. | |
| 2022/0179220 A1 | 6/2022 | Hoover et al. | |
| 2022/0230404 A1 | 7/2022 | Powderly et al. | |
| 2023/0057175 A1 | 2/2023 | Powderly et al. | |

FOREIGN PATENT DOCUMENTS

| | | | |
|---|---|---|---|
| CN | 101010700 | A | 8/2007 |
| CN | 102193631 | A | 9/2011 |
| CN | 102405453 | A | 4/2012 |
| CN | 102419631 | A | 4/2012 |
| CN | 103460256 | A | 12/2013 |
| CN | 103713737 | A | 4/2014 |
| CN | 104067316 | A | 9/2014 |
| CN | 104137044 | A | 11/2014 |
| CN | 104641319 | A | 5/2015 |
| CN | 104932679 | A | 9/2015 |
| CN | 105264461 | A | 1/2016 |
| CN | 105283825 | A | 1/2016 |
| CN | 105324736 | A | 2/2016 |
| CN | 105339870 | A | 2/2016 |
| CN | 105378625 | A | 3/2016 |
| CN | 106104361 | A | 11/2016 |
| EP | 1816552 | A2 | 8/2007 |
| EP | 1837741 | A2 | 9/2007 |
| EP | 2767953 | A1 | 8/2014 |
| EP | 2784632 | A2 | 10/2014 |
| EP | 3015954 | A1 | 5/2016 |
| EP | 3118722 | A1 | 1/2017 |
| EP | 3665550 | A1 | 6/2020 |
| GB | 2376397 | A | 12/2002 |
| JP | H04372012 | A | 12/1992 |
| JP | H6337884 | A | 12/1994 |
| JP | H0962864 | A | 3/1997 |
| JP | H09222949 | A | 8/1997 |
| JP | H11264929 | A | 9/1999 |
| JP | H11288342 | A | 10/1999 |
| JP | 2001522498 | A | 11/2001 |
| JP | 2002170131 | A | 6/2002 |
| JP | 2004110112 | A | 4/2004 |
| JP | 2005222103 | A | 8/2005 |
| JP | 2006126936 | A | 5/2006 |
| JP | 2007222284 | A | 9/2007 |
| JP | 2008307091 | A | 12/2008 |
| JP | 2009069918 | A | 4/2009 |
| JP | 2009070139 | A | 4/2009 |
| JP | 2009151419 | A | 7/2009 |
| JP | 2009187426 | A | 8/2009 |
| JP | 2009237863 | A | 10/2009 |
| JP | 2009295031 | A | 12/2009 |
| JP | 2010218195 | A | 9/2010 |
| JP | 2010238098 | A | 10/2010 |
| JP | 2010279742 | A | 12/2010 |
| JP | 2011059071 | A | 3/2011 |
| JP | 2011123896 | A | 6/2011 |
| JP | 2011159273 | A | 8/2011 |
| JP | 2011528476 | A | 11/2011 |
| JP | 2012059263 | A | 3/2012 |
| JP | 2012084146 | A | 4/2012 |
| JP | 2012108842 | A | 6/2012 |
| JP | 2012155678 | A | 8/2012 |
| JP | 2012168798 | A | 9/2012 |
| JP | 2013054661 | A | 3/2013 |
| JP | 2013131222 | A | 7/2013 |
| JP | 2013145455 | A | 7/2013 |
| JP | 2013152711 | A | 8/2013 |
| JP | 2013218597 | A | 10/2013 |
| JP | 2013222354 | A | 10/2013 |
| JP | 2013541058 | A | 11/2013 |
| JP | 2014017776 | A | 1/2014 |
| JP | 2014085954 | A | 5/2014 |
| JP | 2014093090 | A | 5/2014 |
| JP | 2014134922 | A | 7/2014 |
| JP | 2014174747 | A | 9/2014 |
| JP | 2014182719 | A | 9/2014 |
| JP | 2014186361 | A | 10/2014 |
| JP | 2014531662 | A | 11/2014 |
| JP | 2015503141 | A | 1/2015 |
| JP | 2015114757 | A | 6/2015 |
| JP | 2015133088 | A | 7/2015 |
| JP | 2015155959 | A | 8/2015 |
| JP | 2015524110 | A | 8/2015 |
| JP | 2015536514 | A | 12/2015 |
| JP | 2016029591 | A | 3/2016 |
| JP | 2016031650 | A | 3/2016 |
| JP | 2016035742 | A | 3/2016 |
| JP | 2016506565 | A | 3/2016 |
| JP | 2016507112 | A | 3/2016 |
| JP | 2016508257 | A | 3/2016 |
| JP | 2016516241 | A | 6/2016 |
| JP | 2016522463 | A | 7/2016 |
| JP | 5985116 | B1 | 9/2016 |
| JP | 2016530600 | A | 9/2016 |
| JP | 2017500673 | A | 1/2017 |
| JP | WO2014208689 | A1 | 2/2017 |
| JP | WO2015059976 | A1 | 3/2017 |
| JP | WO 2015156149 | A1 | 4/2017 |
| JP | WO2016013272 | A1 | 4/2017 |
| JP | 2017526030 | A | 9/2017 |

(56) References Cited

FOREIGN PATENT DOCUMENTS

| | | | |
|---|---|---|---|
| JP | 2018517967 | A | 7/2018 |
| JP | 7149289 | B2 | 10/2022 |
| JP | 2023097014 | A | 7/2023 |
| KR | 20010012091 | A | 2/2001 |
| KR | 20050087377 | A | 8/2005 |
| KR | 20120106519 | A | 9/2012 |
| KR | 20140090683 | A | 7/2014 |
| KR | 20140093970 | A | 7/2014 |
| KR | 20140147378 | A | 12/2014 |
| KR | 20150025115 | A | 3/2015 |
| KR | 20150084485 | A | 7/2015 |
| KR | 20150092165 | A | 8/2015 |
| KR | 20150095868 | A | 8/2015 |
| KR | 20150140807 | A | 12/2015 |
| KR | 20150143659 | A | 12/2015 |
| KR | 20160023888 | A | 3/2016 |
| WO | WO 2012098621 | A1 | 7/2012 |
| WO | WO2012135546 | A1 | 10/2012 |
| WO | WO2013028813 | A1 | 2/2013 |
| WO | WO2013093906 | A1 | 6/2013 |
| WO | WO2014085789 | A1 | 6/2014 |
| WO | WO2014093477 | A1 | 6/2014 |
| WO | WO2014099231 | A2 | 6/2014 |
| WO | WO2014126966 | A1 | 8/2014 |
| WO | WO2014128507 | A2 | 8/2014 |
| WO | WO2014129105 | A1 | 8/2014 |
| WO | WO2014158928 | A2 | 10/2014 |
| WO | WO2014164901 | A1 | 10/2014 |
| WO | WO2014168901 | A1 | 10/2014 |
| WO | WO2014168995 | A1 | 10/2014 |
| WO | WO2014190099 | A1 | 11/2014 |
| WO | WO2014197387 | A1 | 12/2014 |
| WO | WO2014204755 | A1 | 12/2014 |
| WO | WO2014208689 | A1 | 12/2014 |
| WO | WO2014209772 | A1 | 12/2014 |
| WO | WO2015051047 | A1 | 4/2015 |
| WO | WO2015059976 | A1 | 4/2015 |
| WO | WO2015126987 | A1 | 8/2015 |
| WO | WO2015161307 | A1 | 10/2015 |
| WO | WO2015192117 | A1 | 12/2015 |
| WO | WO2016023123 | A1 | 2/2016 |
| WO | WO2016031358 | A1 | 3/2016 |
| WO | WO2016203792 | A1 | 12/2016 |
| WO | WO2017034667 | A1 | 3/2017 |
| WO | WO2017070121 | A1 | 4/2017 |
| WO | WO2017131970 | A1 | 8/2017 |
| WO | WO2017172982 | A1 | 10/2017 |
| WO | WO2017184604 | A1 | 10/2017 |
| WO | WO2017201329 | A1 | 11/2017 |
| WO | WO2018031621 | A1 | 2/2018 |
| WO | WO2018195099 | A1 | 10/2018 |
| WO | WO2019067902 | A1 | 4/2019 |

OTHER PUBLICATIONS

Wikipedia: “Speech Recognition”, Wikipedia, accessed Jun. 10, 2016, in 19 pages. URL: https://en.wikipedia.org/wiki/Speech_recognition.

Wikipedia: “Simultaneous localization and mapping”, Wikipedia, accessed Oct. 22, 2015, in 7 pages. URL: https://en.wikipedia.org/wiki/Simultaneous_localization_and_mapping.

“Kinect Sensor”, Microsoft Corporation, 2012, printed Apr. 11, 2016, in 5 pages. URL: https://msdn.microsoft.com/enus/library/hh438998(d=printer).asp.

Wikipedia: “Field of view”, Wikipedia, retrieved Nov. 1, 2015, in 5 pages. URL: https://en.wikipedia.org/wiki/Field_of_view.

Wikipedia: “Augmented cognition”, Wikipedia, printed Aug. 6, 2016, in 4 pages. URL: https://en.wikipedia.org/wiki/Augmented_cognition.

Wikipedia: “Cone Tracing,” Wikipedia, accessed Nov. 1, 2015, in 3 pages. URL: https://en.wikipedia.org/wiki/Cone_tracing.

Debarba et al., “Disambiguation Canvas: a precise selection technique for virtual environments”, Lecture Notes in Computer Science, vol. 8119. Springer, Berlin, Heidelberg, Sep. 2013, in 18 pages.

Cox, “PS3 controller makes move on Android games”, published: Aug. 9, 2011, theregister.co.uk, https://www.theregister.co.uk/2011/08/09/ps3_controller_gets_android_support/ (Year: 2011).

Christoforou, C. et al., “From the eyes and the heart: a novel eye-gaze metric that predicts video preferences of a large audience”, Frontiers in Psychology, vol. 6: 579, published online May 12, 2015, in 11 pages. URL: http://www.ncbi.nlm.nih.gov/pmc/articles/PMC4428128/.

Cashion, J., “Intelligent Selection Techniques for Virtual Environments”, Dissertation, University of Central Florida, Dec. 2014, in 198 pages.

Bowman, D.A., et al.: “An Evaluation of techniques for Grabbing and Manipulating Remote Objects in Immersive Virtual Environments.” Proceedings of 1997 Symposium on Interactive 3D Graphics Apr. 27-30, 1997, Providence, RI, USA.

Bernsen, “Speech and 2D deictic gesture reference to virtual scenes,” In: International Tutorial Research Workshop on Perception and Interactive Technologies for Speech-Based Systems, Jun. 19, 2006.

Wikipedia: “Volume ray casting”, Wikipedia, accessed Nov. 1, 2015, in 4 pages. URL: https://en.wikipedia.org/wiki/Volume_ray_casting.

Wikipedia: “Ray casting”, Wikipedia, accessed Nov. 1, 2015, in 4 pages. URL: https://en.wikipedia.org/wiki/Ray_casting.

Melder, N. et al., “Translation and Rotation of Multi-Point Contacted Virtual Objects”, Proceedings of the World Haptics Conference, 2003, in 10 pages.

Kaiser, E. et al., “Mutual Disambiguation of 3D Multimodal Interaction in Augmented and Virtual Reality”, Proceedings of the 5th International Conference on Multimodal Interfaces, 2003, in 9 pages. URL: http://www.academia.edu/download/307 44 360/p128-kaiser.pdf.

Heidemann, G. et al., “Multimodal Interaction in an Augmented Reality Scenario”, Proceedings of the 6th International Conference on Multimodal Interfaces, 2004, in 8 pages. URL: https://ni.www.techfak.uni-bielefeld.de/files/heidemann_ba_bekel_etal_ICMI04_reprint.pdf.

Sadshark, “Useful Shortcut Keys List—Eve Online”, reddit.com, available: Jun. 27, 2013, https://www.reddit.com/r/Eve/comments/1gq0eu/useful_shortcut_keys_list/, https://web.archive.org/web/20130627085144/https://www.reddit.com/r/Eve/comments/1gq0eu/useful_shortcut_keys_list/ (Year: 2013).

U.S. Appl. No. 14/212,961, filed Mar. 14, 2014, Schowengerdt et al.

U.S. Appl. No. 14/331,218, filed Jul. 14, 2014, Abovitz et al.

U.S. Appl. No. 14/555,585, filed Nov. 27, 2014, Schowengerdt.

U.S. Appl. No. 14/641,376, filed Mar. 7, 2015, Bradski et al.

U.S. Appl. No. 14/690,401, filed Apr. 18, 2015, Miller et al.

U.S. Appl. No. 62/005,807, filed May 30, 2014, Klug et al.

U.S. Appl. No. 62/012,273, filed Jun. 14, 2014, Bradski.

Invitation to Pay Additional Fees for PCT Application No. PCT/US2018/028002, dated May 31, 2018.

Invitation to Pay Additional Fees And, Where Applicable, Protest Fee for PCT Application No. PCT/US16/57554, dated Dec. 30, 2016.

International Search Report and Written Opinion for PCT Application No. PCT/US16/57554, dated Mar. 2, 2017.

International Search Report and Written Opinion for PCT Application No. PCT/US2018/028002, dated Aug. 23, 2018.

European Extended Search Report, re EP Application No. 17776592.2, dated Oct. 30, 2019.

International Search Report and Written Opinion for PCT Application No. PCT/US17/33399, dated Aug. 14, 2017.

International Search Report and Written Opinion for PCT Application No. PCT/US2017/024844, dated Jun. 22, 2017.

International Preliminary Reporton Patentability for PCT Application No. PCT/US16/57554, dated Apr. 24, 2018.

International Preliminary Report on Patentability for PCT Application No. PCT/US17/33399, dated Nov. 20, 2018.

International Preliminary Report on Patentability for PCT Application No. PCT/US2017/024844, dated Apr. 6, 2018.

(56) References Cited

OTHER PUBLICATIONS

European Extended Search Report, re EP Application No. 16858075.1, dated May 9, 2019.
International Preliminary Report on Patentability for PCT Application No. PCT/US2018/028002, dated Oct. 22, 2019.
Shumin, Z. et al., "Manual and Gaze Input Cascaded (MAGIC) Pointing", In Proceedings of CHI '99: ACM Conference on Human Factors in Computing Systems, May 1999, in 8 pages.
Karlsson, N. et al., "The vSLAM Algorithm for Robust Localization and Mapping", Proc. of Int. Conf. on Robotics and Automation (ICRA), Jan. 2005, in 6 pages.
Graves, A. et al., "Towards End-to-End Speech Recognition with Recurrent Neural Networks", Proceedings of the 31st International Conference on Machine Learning, vol. 32, Jun. 2014, in 9 pages.
Gawande, S. et al., "Neural Network based Hand Gesture Recognition", International Journal of Emerging Research in Management and Technology, Mar. 2013, in 5 pages.
Declaration of Dr. Douglas A. Bowman Under 37 C. F.R. § 1132 including Appendix A (List of Materials Considered) and Appendix B (Curriculum Vitae) and Incorporated Claim Charts CC-1---CC-12.
S. Feiner et al., "A touring machine prototyping 3D mobile augmented reality systems for exploring the urban environment," Digest of Papers. First International Symposium on Wearable Computers, Cambridge, M.A, USA, pp. 74-81 (1997) (" Feiner").
P. Milgram and F. Kishino, "A Taxonomy of Mixed Reality Visual Displays," IEICE Transactions on Information and Systems, vol. E77-D, No. 12, p. 1321-29, Dec. 1994.
R. Azuma, "A Survey of Augmented Reality," Presence: Teleoperators and Virtual Environments, vol. 6, No. 4, p. 355-385, Aug. 1997.
S. Benford, et al., "Understanding and Constructing Shared Spaces with Mixed-Reality Boundaries," ACM Transactions on Computer—Human Interaction, vol. 5, No. 3, p. 185-223, Sep. 1998.
M. Billinghurst, et al., "The MagidBook a transitional AR interface," Computers & Graphics, vol. 25, No. 5, p. 745-53, Oct. 2001.
J. Carmigniani, et al., "Augmented reality technologies, systems and applications," Multimedia Tools and Applications, vol. 51, No. 1, p. 341-377, Dec. 2010.
D. Schmalstieg, et al., "The Studierstube Augmented Reality Project," Presence, vol. 11 No. 1, p. 33-54, Feb. 2002.
B. Ullmer, "Models and Mechanisms for Tangible User Interfaces," PhD Diss., Massachusetts Institute of Technology (Jun. 1997).
B. Ullmer and H. Ishii, "Emerging frameworks for tangible user interfaces," IBM Systems Journal, vol. 39, Nos. 3 & 4, pp. 915-931 (2000).
T. Hollerer, "User Interfaces for Mobile Augmented Reality Systems," PhD Diss., Columbia University (2004).
P. Antoniac, "Augmented Reality Based User Interface for Mobile Applications and Services," University of Oulu (Jun. 2005).
M. Levoy and R. Whitaker, "Gaze-Directed Volume Rendering," 13D '90: Proceedings of the 1990 Symposium on Interactive 3D Graphics, p. 217-223, Feb. 1990.
T. Ohshima et al., "Gaze-Directed Adaptive Rendering for Interacting with Virtual Space," Proceedings of the IEEE 1996 Virtual Reality Annual International Symposium, p. 103-110, 1996.
H. Zha et al, "Dynamic Gaze-Controlled Levels of Detail of Polygonal Objects in 3-D Environment Modeling," Second International Conference on 3-D Digital Imaging and Modeling 1999, p. 321-330, 1999.
M. Reddy, "Perceptualiy Optimized 30 Graphics," IEEE Computer Graphics and Applications 21, No. 5, p. 68-75, Jul.-Aug. 2001.
L. C. Loschky et al., "Perceptual Effects of a Gaze-Contingent Multi-Resolution Display Based on a Model of Visual Sensitivity," Proceedings of the ARL Federated Laboratory 5th Annual Symposium—ADID Consortium, p. 53-58, 2001.
L. C. Loschky and G. S. Wolverton, "How Late Can You Update Gaze-Contingent Multi-Resolutional Displays Without Detection?," ACM Transactions on Multimedia Computing, Communications, and Applications 3, No. 4, Art. 7, p. 1-10, 2007.
A.T. Duchowski and A. Coltekin, "Foveated Gaze-Contingent Displays for Peripheral LOD Management, 3D Visualization, and Stereo Imaging," ACM Transactions on Multimedia Computing, Communications, and Applications 3, No. 4, Art. 6, p. 1-18, 2007.
Request for Reexamination of U.S. Pat. No. 11,507,204 dated Dec. 23, 2024, Assigned Reexamination Control No. 90/019,786.
Claim Chart 1 (CC-1) filed with Request for Reexamination of U.S. Pat. No. 11,507,204 dated Dec. 23, 2024.
Claim Chart 2 (CC-2) filed with Request for Reexamination of U.S. Pat. No. 11,507,204 dated Dec. 23, 2024.
Claim Chart 3 (CC-3) filed with Request for Reexamination of U.S. Pat. No. 11,507,204 dated Dec. 23, 2024.
Claim Chart 4 (CC-4) filed with Request for Reexamination of U.S. Pat. No. 11,507,204 dated Dec. 23, 2024.
Claim Chart 5 (CC-5) filed with Request for Reexamination of U.S. Pat. No. 11,507,204 dated Dec. 23, 2024.
Claim Chart 6 (CC-6) filed with Request for Reexamination of U.S. Pat. No. 11,507,204 dated Dec. 23, 2024.
Claim Chart 7 (CC-7) filed with Request for Reexamination of U.S. Pat. No. 11,507,204 dated Dec. 23, 2024.
Claim Chart 8 (CC-8) filed with Request for Reexamination of U.S. Pat. No. 11,507,204 dated Dec. 23, 2024.
Claim Chart 9 (CC-9) filed with Request for Reexamination of U.S. Pat. No. 11,507,204 dated Dec. 23, 2024.
Claim Chart 10 (CC-10) filed with Request for Reexamination of U.S. Pat. No. 11,507,204 dated Dec. 23, 2024.
Claim Chart 11 (CC-11) filed with Request for Reexamination of U.S. Pat. No. 11,507,204 dated Dec. 23, 2024.
Claim Chart 12 (CC-12) filed with Request for Reexamination of U.S. Pat. No. 11,507,204 dated Dec. 23, 2024.
ARTool Kit: https://web.archive.org/web/20051013062315/http://www.hitl.washington.edu:80/artoolkit/documentation/hardware.htm, archived Oct. 13, 2005.
Azuma "A Survey of Augmented Reality" Teleoperators and Virtual Environments 6 4 (Aug. 1997) pp. 355-385, https://web.archive.org/web/20010604100006/http://www.cs.unc.edu/-azuma/ARpresence.pdf.
Azuma "Predictive Tracking for Augmented Realty" TR95-007 Department of Computer Science UNC-Chapel Hill NC Feb. 1995.
Bimber, et al., "Spatial Augmented Reality—Merging Real and Virtual Worlds," 2005 https://web.media.mit.edurraskar/book/BimberRaskarAugmentedRealityBook.pdf.
Bolt R. "'Put-That-There': Voice and Gesture at the Graphics Interface" ACM SIGGRAPH Computer Graphics Proceedings of the 7th annual Conference on Computer Graphics and Interactive Techniques vol. Jul. 14, 1980 pp. 262-270 in 9 pages.
Chinese search report issued in connection with CN application No. 201680074220.6 dated Feb. 6, 2020, 1 page.
Chinese search report issued in connection with CN application No. 201780033339.3 dated Oct. 8, 2021, 1 page.
Chinese search report issued in connection with CN application No. 201780044955.9 dated Jan. 25, 2021, 1 page.
Chinese search report issued in connection with CN application No. 201780062338.1 dated Sep. 8, 2021, 1 page.
Chinese search report issued in connection with CN application No. 201880040284.3 dated Jun. 24, 2020, 1 page.
European Extended Search Report, re EP Application No. 17786528.4, dated Sep. 24, 2019.
European Extended Search Report, re EP Application No. EP17800195.4 dated Jan. 23, 2020, 11 pages.
European Extended Search Report, re EP Application No. EP17840184.0 dated Feb. 24, 2020, 09 pages.
European Extended Search Report, re EP Application No. EP18788499.4 dated Aug. 25, 2020, 09 pages.
European Search Report, re EP Application No. 21165266.4 dated Jul. 9, 2021, 14 pages.
European Search Report, re EP Application No. EP23177854.9 dated Jun. 26, 2023, 12 pages.
European Search Report, re EP Application No. EP22171762.2 dated Aug. 3, 2022, 08 pages.
International Preliminary Report on Patentability for PCT Application No. PCT/US2017/028297, issued Oct. 23, 2018.

(56) References Cited

OTHER PUBLICATIONS

International Preliminary Report on Patentability for PCT Application No. PCT/US2017/46034 dated Feb. 12, 2019.
International Preliminary Report on Patentability for PCT Application No. PCTIUS2017/024844, mailed Apr. 6, 2018.
International Search Report and Written Opinion for PCT Application No. PCT/US2017/028297, mailed Jun. 29, 2017.
International Search Report and Written Opinion for PCT Application No. PCT/US2017/46034 dated Oct. 18, 2017.
Jacob "Eye Tracking in Advanced Interface Design" Human-Computer Interaction Lab Naval Research Laboratory Washington D.C. / paper/ in Virtual Environments and Advanced Interface Design ed. by W. Barfield and T.A. Furness pp. 258-288 Oxford University Press New York (1995).
Japanese search report issued in connection with JP application No. 2018-550396 dated Feb. 10, 2021, 72 pages.
Japanese search report issued in connection with JP application No. 2018-519943 dated Aug. 21, 2020, 52 pages.
Japanese search report issued in connection with JP application No. 2018-560645 dated Mar. 31, 2021, 447 pages.
Japanese search report issued in connection with JP application No. 2019-507143 dated Oct. 7, 2020, 60 pages.
Japanese search report issued in connection with JP application No. 2019-555935 dated Mar. 11, 2022, 41 pages.
Japanese search report issued in connection with JP application No. 2020-105691 Apr. 16, 2021, 25 pages.
Japanese search report issued in connection with JP application No. 2021-012808 Jan. 28, 2022, 35 pages.
Japanese search report issued in connection with JP application No. 2021-119483 Jul. 28, 2022, 33 pages.
Japanese search report issued in connection with JP application No. 2022-049399 Apr. 26, 2023, 62 pages.
Japanese search report issued in connection with JP application No. 2022-104508 Jun. 20, 2023, 42 pages.
Japanese search report issued in connection with JP application No. 2023-001014 Jan. 31, 2024, 59 pages.
Maimone, A. et al., "Computational Augmented Reality Eyeglasses", 2013 IEEE International Symposium on Mi ed and Augmented Reality, 2013, in 10 pages. URL: https://pdfs.semanticscholar.org/3lcf/7b9bbc9199b0432483789ec65d81 e64e4ddc.pdf.
Marti, S., "Put That There", YouTube, published Oct. 25, 2006, accessed Apr. 12, 2017, in 1 page. URL: https://www.youtube.com/watch?v=PeWwfhsSqsc.
Taniverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Watanabe It turns to the design of the multi-modal inquiry language in wisdom beauty, other 1 person, and virtual world database system, and is IEICE Technical Report, JP, Institute of Electronics, Information and Communication Engineers, Jul. 11, 2001, vol. 101 No. 192,121-128.
Z-Targeting Z-targeting/Zelapedia/FANDOM powered by Wikia. Retrieved from "https://zelda.fandom.com/wiki/Z-targeting?oldid=538812".
Markus Rader et al: "MobiZone", Mobile and Ubiquitous Multimedia, ACM, 2 Penn Plaza, Suite 701 New York NY 10121-0701 USA, Dec. 2, 2013 (Dec. 2, 2013), pp. 1-10, XP058036362, DOI: 10.1145/2541831.2541836 ISBN: 978-1-4503-2648-3.
European Extended Search Report, re EP Application No. 24178132.7, dated Sep. 11, 2024, 11 pages.
Japanese search report issued in connection with application No. 2023-97014 dated May 20, 2024, 48 pages.
European Extended Search Report, re EP Application No. 24187288.6, dated Oct. 15, 2024, 09 pages.

* cited by examiner

AUTOMATIC PLACEMENT OF A VIRTUAL OBJECT IN A THREE-DIMENSIONAL SPACE

CROSS-REFERENCE TO RELATED APPLICATION(S)

This application is a continuation of U.S. application Ser. No. 17/679,774, filed on Feb. 24, 20222, entitled AUTOMATIC PLACEMENT OF A VIRTUAL OBJECT IN A THREE-DIMENSIONAL SPACE. U.S. application Ser. No. 17/679,774 is a continuation of U.S. application Ser. No. 17/144,574, filed on Jan. 8, 2021, entitled AUTOMATIC PLACEMENT OF A VIRTUAL OBJECT IN A THREE-DIMENSIONAL SPACE. U.S. application Ser. No. 17/144,574 is a continuation of U.S. application Ser. No. 16/821,653, filed on Mar. 17, 2020, entitled AUTOMATIC PLACEMENT OF A VIRTUAL OBJECT IN A THREE-DIMENSIONAL SPACE. U.S. application Ser. No. 16/821,653 is a continuation of U.S. application Ser. No. 15/673,135, filed on Aug. 9, 2017, entitled AUTOMATIC PLACEMENT OF A VIRTUAL OBJECT IN A THREE-DIMENSIONAL SPACE. U.S. application Ser. No. 15/673,135 claims the benefit of priority under 35 U.S.C. § 119(e) to U.S. Provisional Application No. 62/373,693, filed on Aug. 11, 2016, entitled AUTOMATIC PLACEMENT OF VIRTUAL OBJECTS IN A 3D ENVIRONMENT, and U.S. Provisional Application No. 62/373,692, filed on Aug. 11, 2016, entitled VIRTUAL OBJECT USER INTERFACE WITH GRAVITY. This application claims priority to U.S. application Ser. No. 17/679,774; U.S. application Ser. No. 17/144,574; U.S. application Ser. No. 16/821,653; U.S. application Ser. No. 15/673,135; U.S. Provisional Application No. 62/373693; and U.S. Provisional Application No. 62/373,692, each of which is additionally hereby incorporated by reference herein in their entirety.

FIELD OF THE DISCLOSURE

The present disclosure relates to virtual reality and augmented reality imaging and visualization systems and more particularly to automatically repositioning a virtual object in a three-dimensional (3D) space.

BACKGROUND OF THE DISCLOSURE

Modern computing and display technologies have facilitated the development of systems for so called “virtual reality”, “augmented reality”, or “mixed reality” experiences, wherein digitally reproduced images or portions thereof are presented to a user in a manner wherein they seem to be, or may be perceived as, real. A virtual reality, or “VR”, scenario typically involves presentation of digital or virtual image information without transparency to other actual real-world visual input; an augmented reality, or “AR”, scenario typically involves presentation of digital or virtual image information as an augmentation to visualization of the actual world around the user; a mixed reality, or “MR”, related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY OF THE DISCLOSURE

Various embodiments of an augmented reality system for automatically repositioning a virtual object are described.

In one example embodiment, an augmented reality (AR) system for automatically repositioning a virtual object in a three-dimensional (3D) environment is disclosed. The AR system comprises an AR display configured to present virtual content in a 3D view and a hardware processor in communication with the AR display. The hardware processor is programmed to: identify a target virtual object in the 3D environment of the user, wherein the target virtual object is assigned one vector representing a first location and a first orientation; receive an indication to attach the target virtual object to a destination object, wherein the destination object is assigned at least one vector representing a second location and a second orientation; calculate a trajectory between the target virtual object and the destination object based at least partly on the first location and the second location; move the target virtual object along the trajectory towards the destination object; track a current location of the target virtual object; calculate a distance between the target virtual object and the destination object based at least partly on the current location of the target virtual object and the second location; determine whether the distance of the target virtual object and the destination virtual object is less than a threshold distance; automatically attach the target virtual object to the destination object and orient the target virtual object to the second orientation in response to a comparison that the distance is less than or equal to the threshold distance; and render, by the AR display, the target virtual object at the second location with the second orientation where the target virtual object is overlaid on the destination object.

In another example embodiment, a method for automatically repositioning a virtual object in a three-dimensional (3D) environment is disclosed. The method may be performed under control of an augmented reality (AR) system comprising computer hardware and the AR system configured to permit user interactions with objects in a 3D environment. The method comprises: identifying a target virtual object in the user’s 3D environment, the target virtual object having a first position and a first orientation; receiving an indication to reposition the target virtual object with respect to a destination object; identifying parameters for repositioning the target virtual object; analyzing affordances associated with at least one of the 3D environment, the target virtual object, and the destination object; calculating values of the parameters for repositioning the target virtual object based on the affordances; determining a second position and a second orientation for the target virtual object and a movement of the target virtual object based on the values of the parameters for repositioning the target virtual object; and rendering the target virtual object at the second position and the second orientation and the movement of the target virtual object for reaching the second position and the second orientation from the first position and the first orientation.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
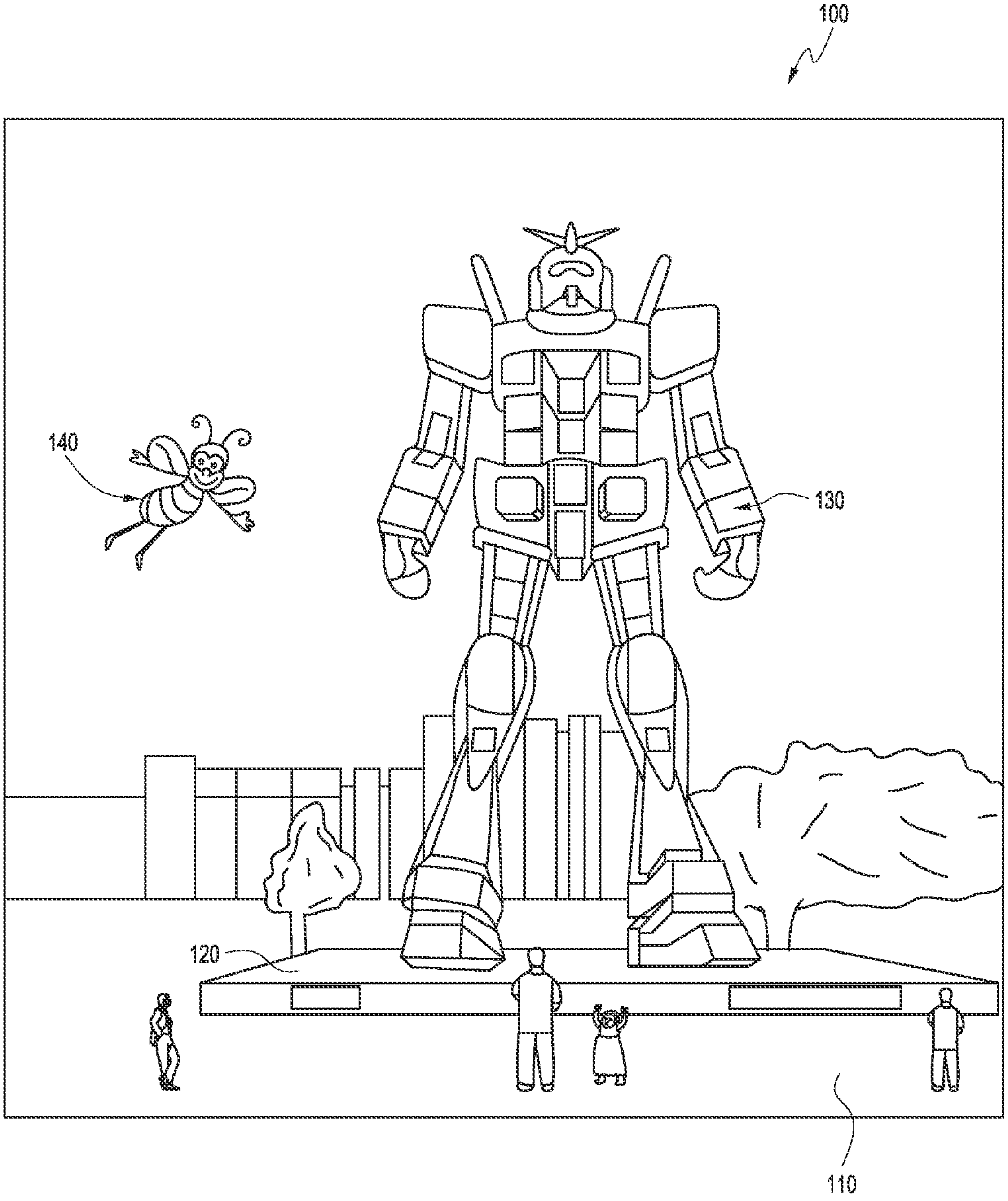
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure

DETAILED DESCRIPTION

Overview

In an AR/MR environment, a user may want to reposition a virtual object by changing the virtual object's position or orientation. As one example, a user can move a virtual object in a three-dimensional (3D) space and attach the virtual object to a physical object in the user's environment. The virtual object may be a two-dimensional (2D) or a 3D object. For example, the virtual object may be a planar, 2D television display or a 3D virtual coffee pot. The user can move the virtual object along a trajectory and attach the virtual object to the physical object by using a user input device (such as, e.g., a totem) and/or by changing a user's pose. For example, the user may move the user input device to cause a virtual television (TV) screen to move from a table to a wall. Similarly, the AR system may allow a user to select and move the virtual object with a head pose. As the user moves his head, the virtual object also moves and is positioned and oriented accordingly.

However, the movements of the virtual objects in the 3D space can sometimes be problematic for a user, because the movements may create optical illusions which can cause confusion for the user regarding his current position. For example, the user may be confused as to whether an object is moving away from him or moving toward him. These optical illusions can cause cognitive fatigue when the user interacts with the AR system.

Furthermore, while a user is attempting to put a virtual object on a surface of a destination object or inside of the destination object, the user often needs to make refined movements to orient and position the virtual object in multiple directions in the 3D space to align the virtual object with the destination object. For example, when the user moves a virtual TV screen from a table to a wall, the user may need to orient the virtual screen so that the surface normal of the TV screen is facing the user (e.g., the content displayed by the TV screen is facing the user instead of the wall). The user may further orient the virtual screen so that the user doesn't have to turn his head when viewing the virtual TV screen. In addition, to make the virtual TV screen appear to be on top of the wall (rather than appearing to be embedded in the wall), the user may need to make small adjustments to the position of the virtual TV screen. These manipulations can be time consuming and difficult for the user to perform with precision, and can cause physical fatigue for the user.

To solve some or all of these problems, the AR system can be configured to automatically reposition the target virtual object by changing the position or orientation of a target virtual object. As one example, the AR system can orient a target virtual object and attach the target virtual object to a destination object when the distance between the virtual object and the target object is less than a threshold distance. The AR system can also automatically reposition the target virtual object by moving the virtual object as if it were subject to a physical force (e.g., a spring force such as Hooke's law, a gravitational force, an adhesive force, an electromagnetic force, etc.). For example, when a virtual object and a target object are within the threshold distance, the AR system may automatically "snap" the virtual object onto the target object as if the virtual object and the target object were attracted together due to an attractive force (e.g., mimicking magnetic attraction or gravity). Accordingly, the AR system may apply a virtual force between objects, wherein the virtual force simulates or acts like a physical force between the objects. Although in many cases the virtual (or simulated physical) force may be attractive, this is not a limitation, and in other cases, the virtual (or simulated physical) force may be repulsive, tending to move the objects away from each other. A repulsive virtual force may be advantageous when placing a target virtual object such that other nearby virtual objects are repelled (at least slightly) from the target object, thereby moving slightly to provide room for the placement of the target virtual object among the other, nearby objects.

The AR system may further orient the virtual object to align the surface normal of the virtual object with user's direction of gaze. As an example, a virtual object may initially be floating in the user's environment. The user may indicate an intention (e.g., via a body gesture or activation of a user input device) to move the virtual object to a horizontal surface such as, e.g., a tabletop or a floor. The AR system may simulate the effect of gravity and automatically drop the virtual object onto the horizontal surface without additional user efforts once the virtual object is sufficiently close to the horizontal surface.

In some situations, the user may want to detach a virtual object from an object to which the virtual object is attached. The AR system can simulate an attractive force between the virtual object and the object (e.g., simulating how a magnet can stick to a magnetic surface such as a refrigerator or how a book lies on a horizontal table) so that the user may not be able to immediately detach the virtual object from the object unless the user provides a sufficient indication that the virtual object should be detached. For example, the user may “grab” the virtual object with his hand or a virtual indicator and “yank” the object (e.g., by a sufficiently rapid change of the user’s hand position or virtual indicator position). The indication to detach the virtual object may be indicated by movement that is greater than a threshold condition (such as when the movement passes a threshold distance, a threshold speed, a threshold acceleration, or a threshold rate of change of the acceleration, in combination or the like). This may be particularly advantageous, because it reduces the likelihood that the user accidentally detaches the virtual object while the user is interacting with the virtual object. As an example, while a user is playing a game using a virtual screen attached to the wall, the user may need to move his totem around to find or interact with friends or enemies. This type of game movement may coincide with the types of movements for detaching the virtual object from the wall. By only detaching the virtual object from the wall if the user’s movements are sufficiently above a suitable threshold, the virtual screen will not be inadvertently detached during gameplay. Additionally, the user usually cannot keep his pose or the user input device still for long periods of time. As a result, the virtual object may accidentally be detached by minor movements of the user when the user does not intend to detach the virtual object. Accordingly, by only detaching the virtual object if the user’s movements are sufficiently above a suitable threshold, minor movements or twitches by the user will not inadvertently detach virtual objects from their intended location or orientation.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD). Further, for the purpose of the present disclosure, the term “AR” is used interchangeably with the term “MR”.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he “sees” a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display’s visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer’s eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
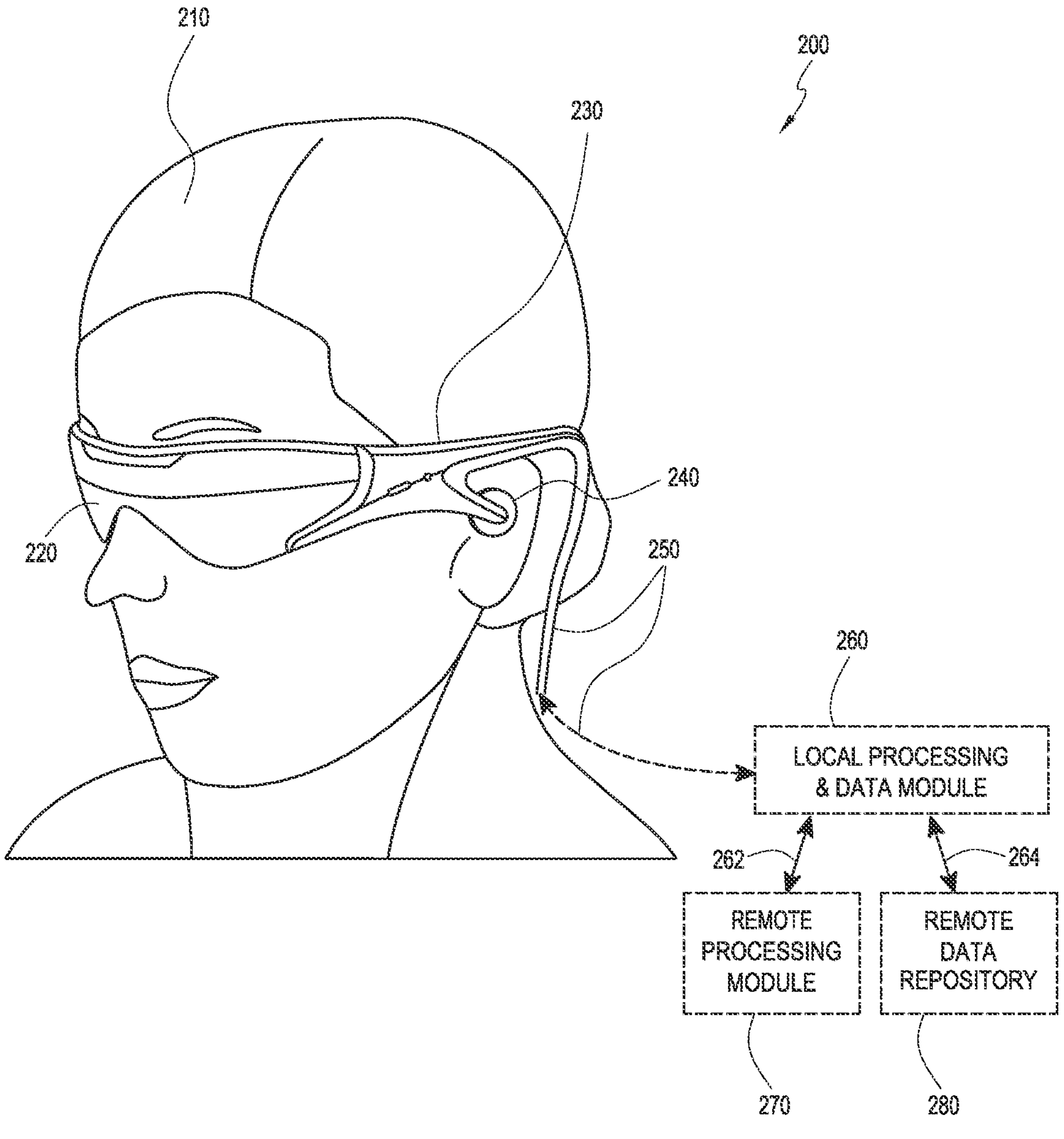
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) for detecting an audio stream from the environment on which to perform voice recognition.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye’s movements or both eyes’ movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
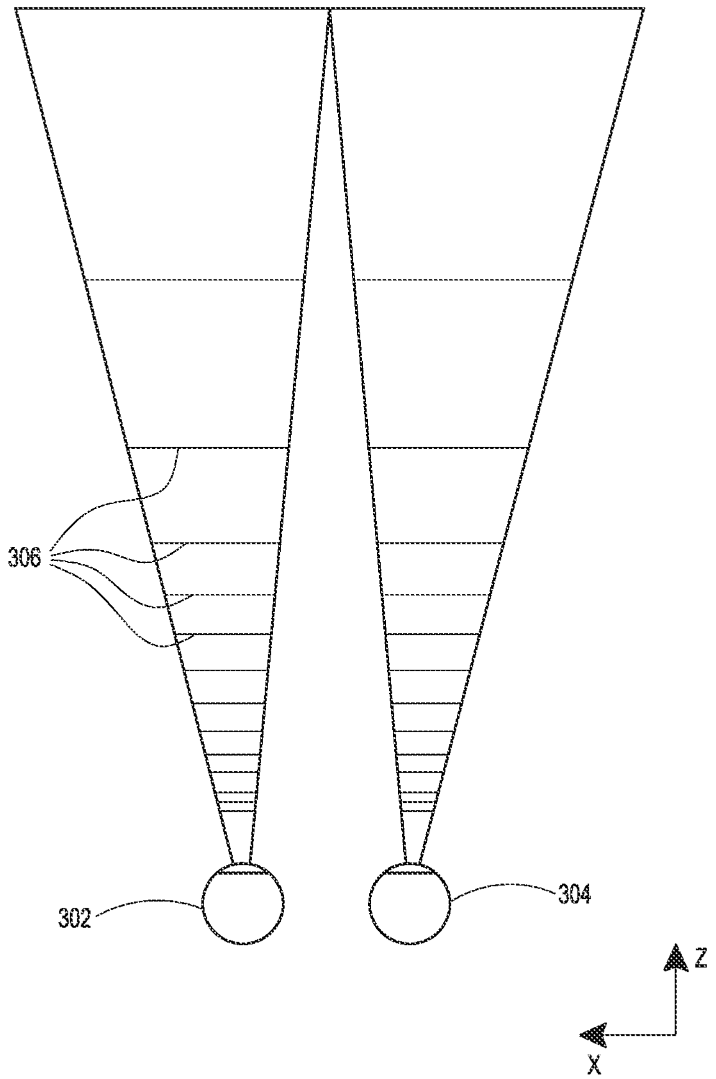
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
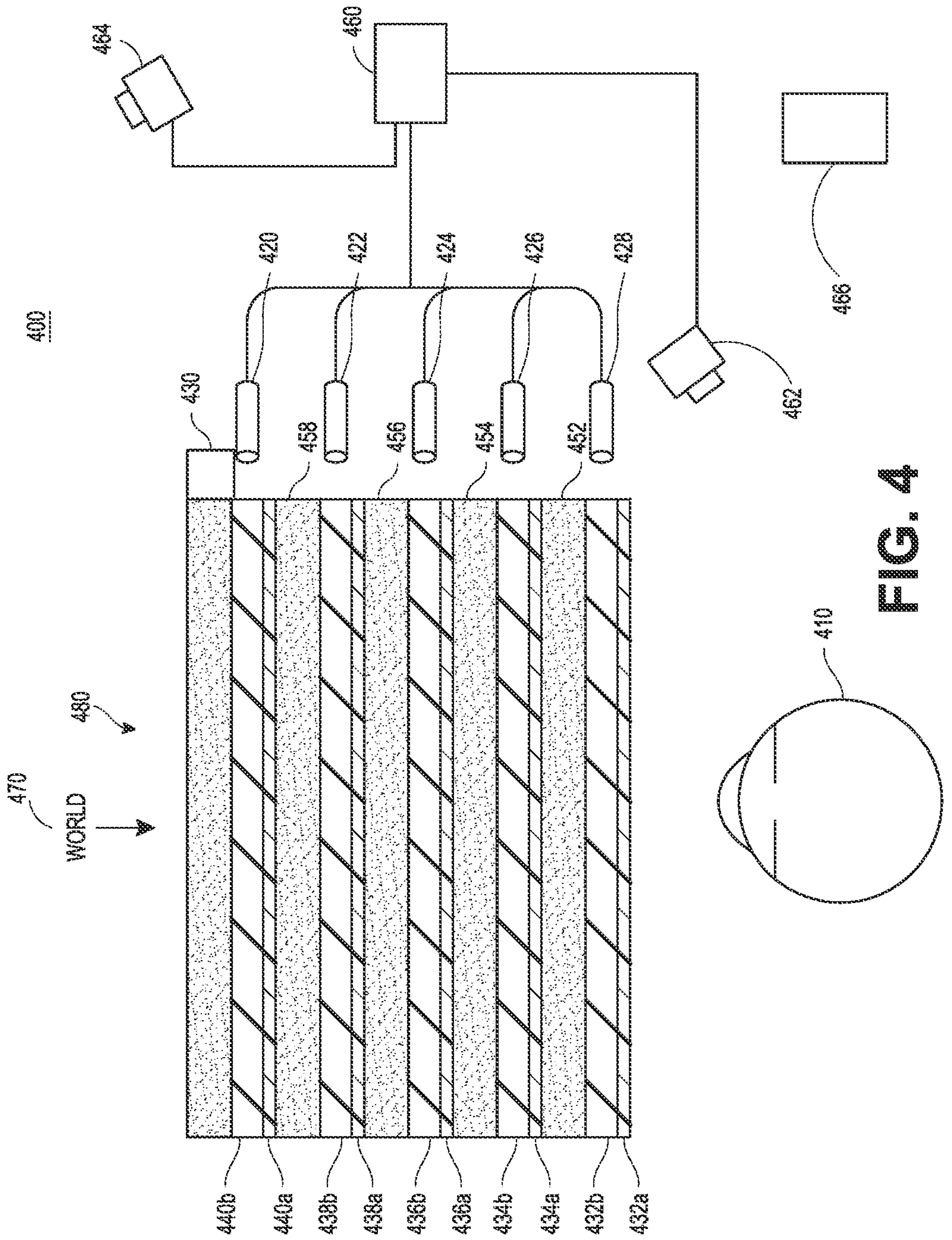
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 4 $\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
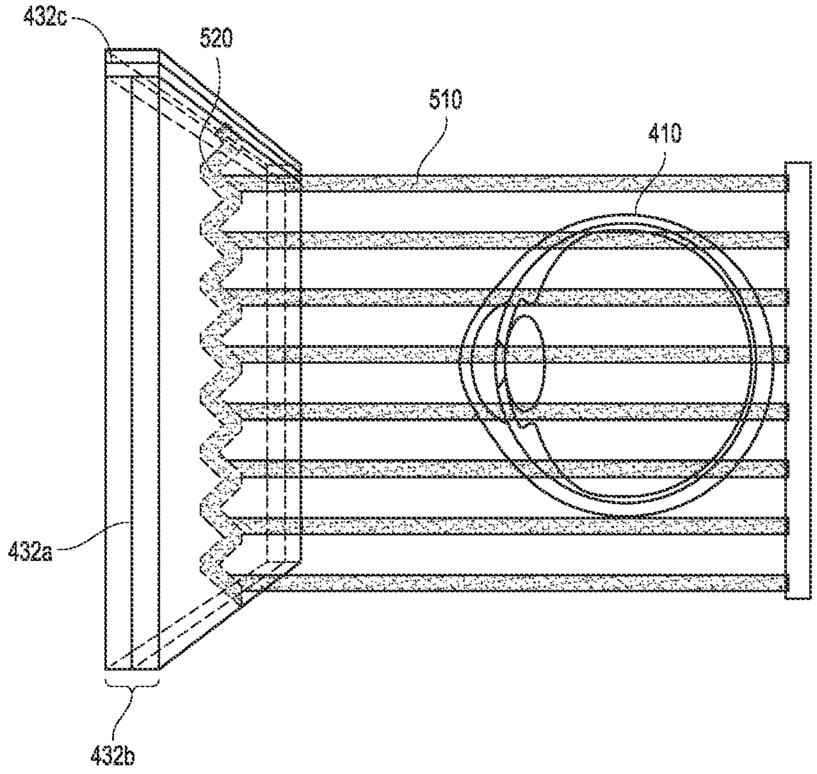
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432*b* at the input edge 432*c* of the waveguide 432*b* and propagates within the waveguide 432*b* by TIR. At points where the light 520 impinges on the DOE 432*a*, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432*b*. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
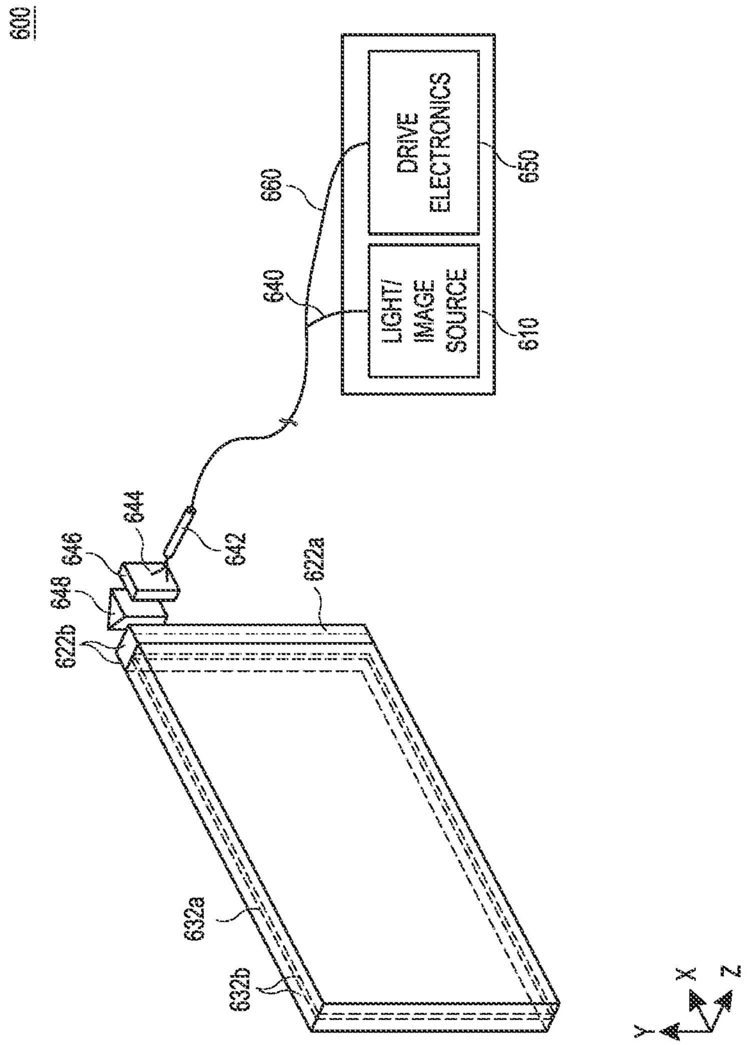
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632*a* (only one is shown in FIG. 6) and one or more DOEs 632*b* associated with each of at least some of the primary waveguides 632*a*. The planar waveguides 632*b* can be similar to the waveguides 432*b*, 434*b*, 436*b*, 438*b*, 440*b* discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622*b* and at least one DOE 622*a* (illustrated by double dash-dot line) associated with the distribution planar waveguide 622*b*. The distribution planar waveguide 622*b* may be similar or identical in at least some respects to the primary planar waveguide 632*b*, having a different orientation therefrom. Likewise, at least one DOE 622*a* may be similar to or identical in at least some respects to the DOE 632*a*. For example, the distribution planar waveguide 622*b* or DOE 622*a* may be comprised of the same materials as the primary planar waveguide 632*b* or DOE 632*a*, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632*b*. The primary planar waveguide 632*b* can relay light along a second axis, preferably orthogonal to first axis (e.g., horizontal or X-axis in view of FIG. 6). Notably, the second axis can be a non-orthogonal axis to the first axis. The primary planar waveguide 632*b* expands the light's effective exit pupil along that second axis (e.g., X-axis). For example, the distribution planar waveguide 622*b* can relay and expand light along the vertical or Y-axis, and pass that light to the primary planar waveguide 632*b* which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622*b* which contains the at least one diffractive optical element (DOE) 622*a*. The collimated light can propagate vertically (relative to the view of FIG. 6) along the distribution planar waveguide 622*b* by TIR, and in doing so repeatedly intersects with the DOE 622*a*. The DOE 622*a* preferably has a low diffraction efficiency. This can cause a fraction (e.g., 10%) of the light to be diffracted toward an edge of the larger primary planar waveguide 632*b* at each point of intersection with the DOE 622*a*, and a fraction of the light to continue on its original trajectory down the length of the distribution planar waveguide 622*b* via TIR.

At each point of intersection with the DOE 622*a*, additional light can be diffracted toward the entrance of the primary waveguide 632*b*. By dividing the incoming light into multiple outcoupled sets, the exit pupil of the light can be expanded vertically by the DOE 622*a* in the distribution planar waveguide 622*b*. This vertically expanded light coupled out of distribution planar waveguide 622*b* can enter the edge of the primary planar waveguide 632*b*.

Light entering primary waveguide 632*b* can propagate horizontally (relative to the view of FIG. 6) along the primary waveguide 632*b* via TIR. As the light intersects with DOE 632*a* at multiple points as it propagates horizontally along at least a portion of the length of the primary waveguide 632*b* via TIR. The DOE 632*a* may advantageously be designed or configured to have a phase profile that is a summation of a linear diffraction pattern and a radially symmetric diffractive pattern, to produce both deflection and focusing of the light. The DOE 632*a* may advantageously have a low diffraction efficiency (e.g., 10%), so that only a portion of the light of the beam is deflected toward the eye of the view with each intersection of the DOE 632*a* while the rest of the light continues to propagate through the primary waveguide 632*b* via TIR.

At each point of intersection between the propagating light and the DOE 632*a*, a fraction of the light is diffracted toward the adjacent face of the primary waveguide 632*b* allowing the light to escape the TIR, and emerge from the face of the primary waveguide 632*b*. In some embodiments, the radially symmetric diffraction pattern of the DOE 632*a* additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632*b* by a multiplicity of DOEs 632*a* at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
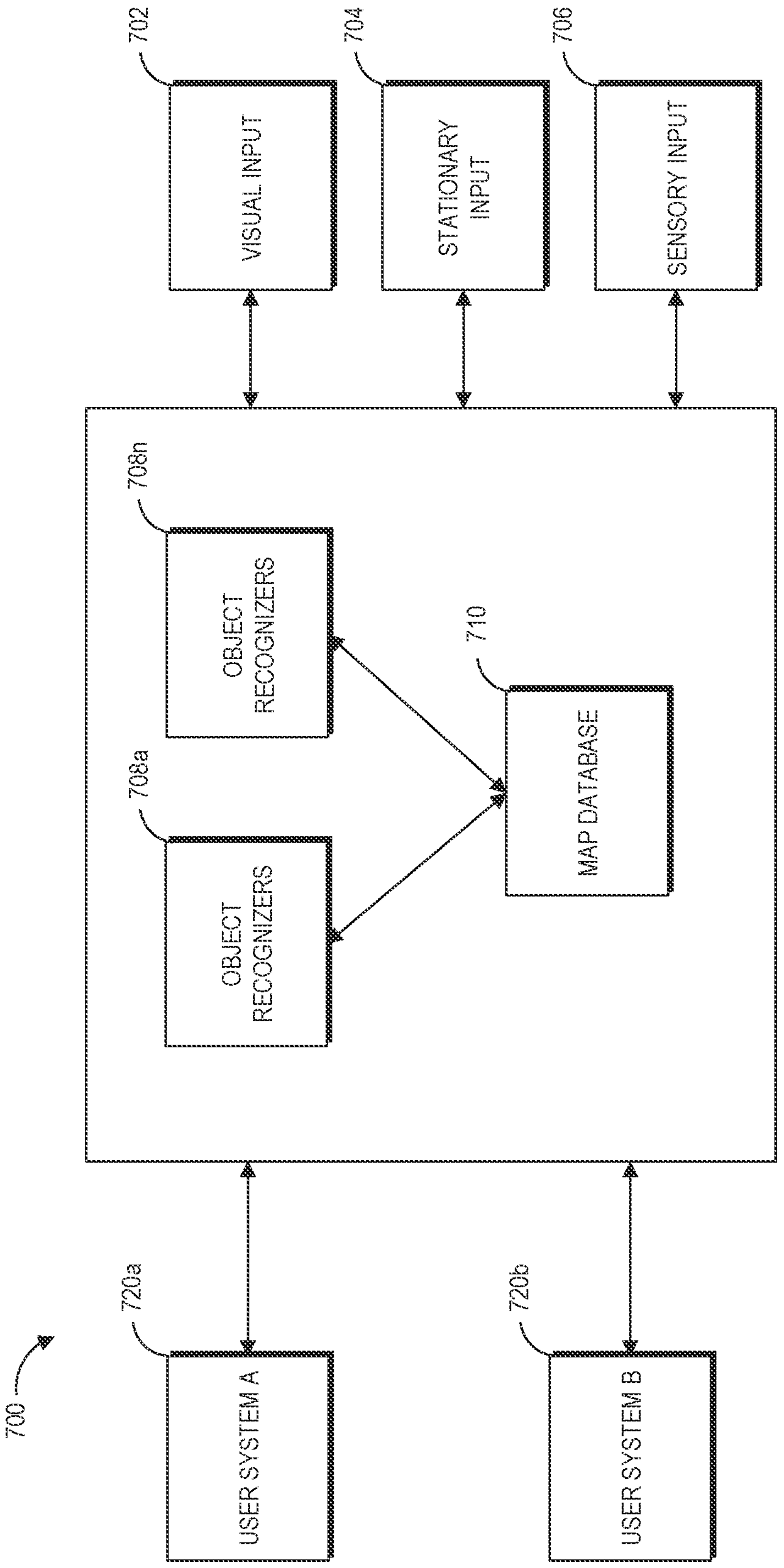
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708*a* to 708*n* may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708*a* may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708*a* to 708*n* may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
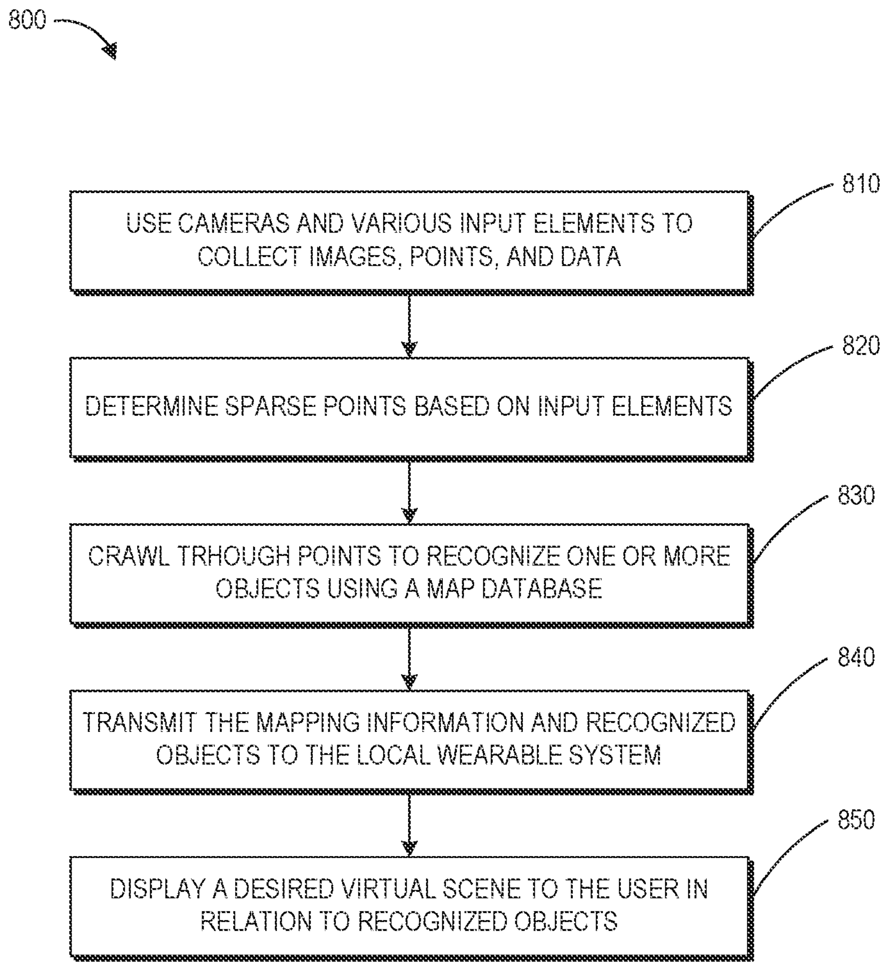
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708*a*-708*n* may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
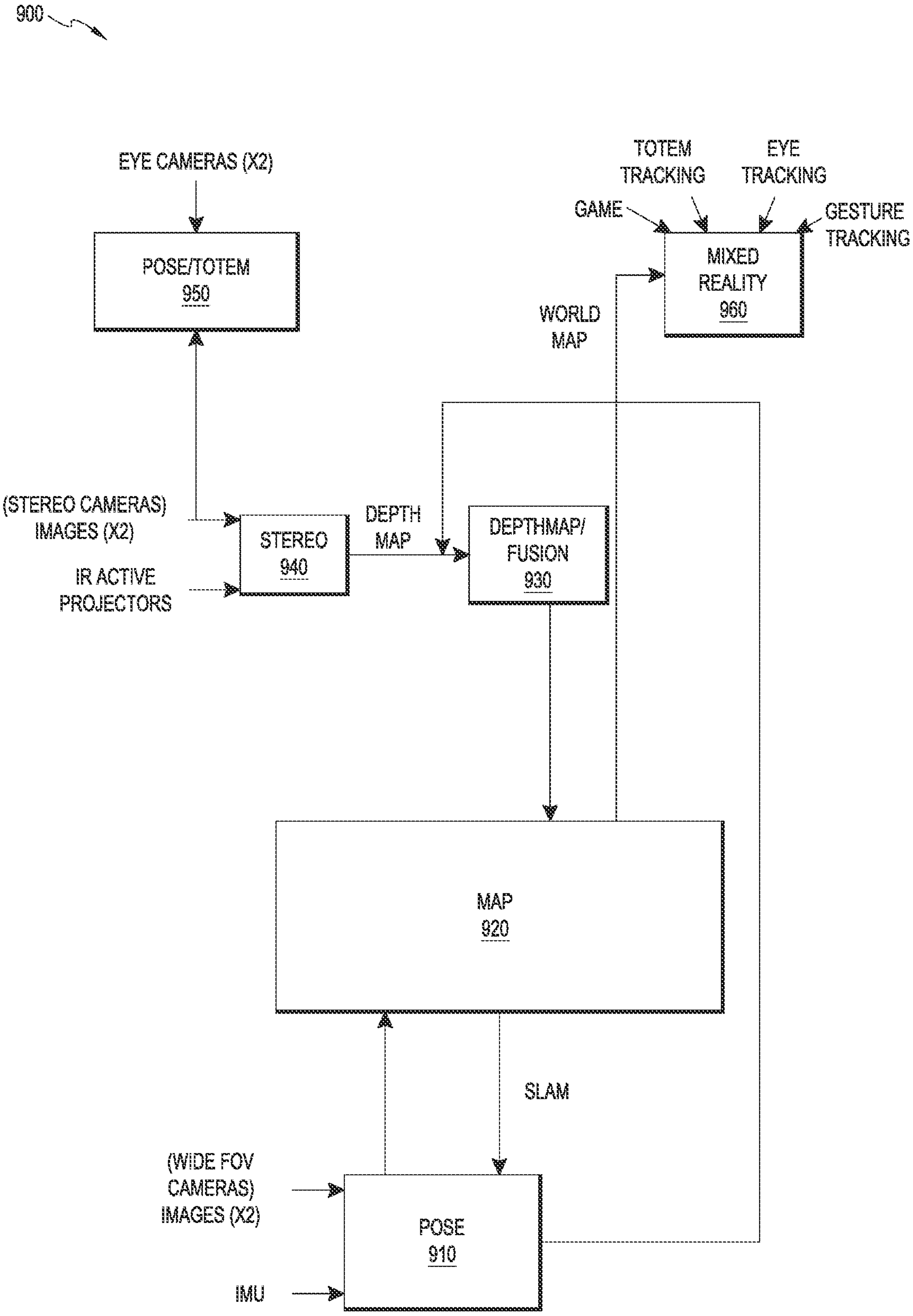
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 950 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Voice recognition can be another input, which can be used alone or in combination with other inputs (e.g., totem tracking, eye tracking, gesture tracking, etc.). The system 900 can include an audio sensor (e.g., a microphone) that receives an audio stream from the environment. The received audio stream can be processed (e.g., by processing modules 260, 270 or central server 1650) to recognize a user's voice (from other voices or background audio), to extract commands, parameters, etc. from the audio stream. For example, the system 900 may identify from an audio stream that the phrase "show me your identification" was said, identify that this phrase was said by the wearer of the system 900 (e.g., a security inspector rather than another person in the inspector's environment), and extract from the phrase and the context of the situation (e.g., a security checkpoint) that there is an executable command to be performed (e.g., computer vision analysis of something in the wearer's FOV) and an object for which the command is to be performed on ("your identification"). The system can incorporate speaker recognition technology to determine who is speaking (e.g., whether the speech is from the wearer of the ARD or another person or voice (e.g., a recorded voice transmitted by a loudspeaker in the environment)) as well as speech recognition technology to determine what is being said. Voice recognition techniques can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
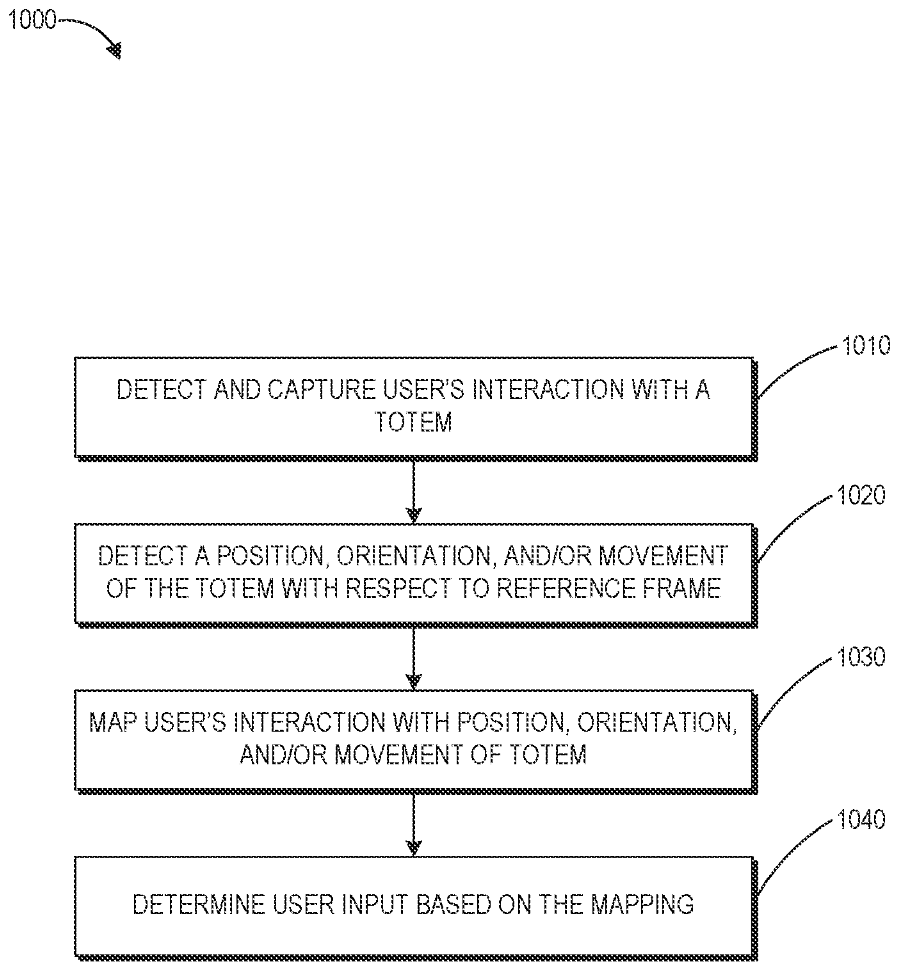
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
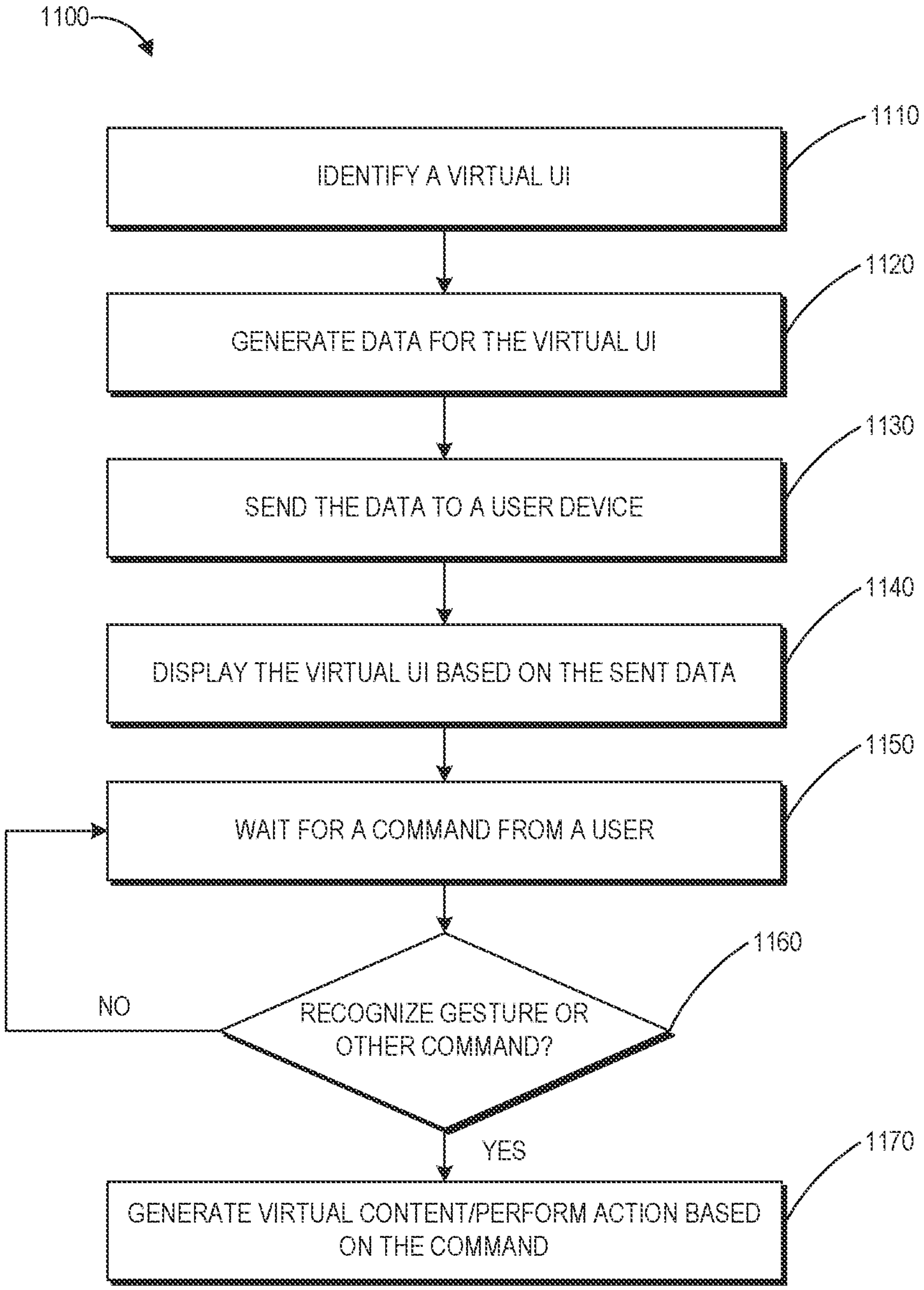
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Example Objects in the User's Environment

As described with reference to FIG. 4, a user of an augmented reality device (ARD) can have a field of regard (FOR) which comprises a portion of the environment around the user that is capable of being perceived by the user via the AR system. For a head-mounted ARD, the FOR may include substantially all of the 4π steradian solid angle surrounding the wearer, because the wearer can move her body, head, or eyes to perceive substantially any direction in space. In other contexts, the user's movements may be more constricted, and accordingly the user's FOR may subtend a smaller solid angle.

The FOR can contain a group of objects which can be perceived by the user via the ARD. The objects may be virtual and/or physical objects. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, widgets (e.g., a virtual representation of a clock), virtual objects in games, graphics or images, etc. Some virtual objects can be both an operating system object and an object in an application.

A virtual object may be a three-dimensional (3D), two-dimensional (2D), or one-dimensional (1D) object. For example, the virtual object may be a 3D coffee mug (which may represent a virtual control for a physical coffee maker). The virtual object may also be a 2D graphical representation of a clock which displays the current time to the user. In some implementations, one or more virtual objects may be displayed within (or associated with) another virtual object. For example, the virtual coffee mug may be shown inside of a user interface plane, although the virtual coffee mug appears to be 3D while the user interface plane may appear to be 2D.

In some embodiments, virtual objects may be associated with physical objects. For example, as shown in FIG. 12B, a virtual book 1220 may appear to be on top of the table 1242. The user can interact with the virtual book 1220 (such as reading and flipping through the pages) as if it is a physical book on the table 1242. As another example, a virtual wardrobe application may be associated with a mirror in the user's FOR. When the user is near the mirror, the user may be able to interact with the virtual wardrobe application which allows the user to simulate the look of different outfits using the ARD.

The objects in the user's FOR can be part of a world model as described with reference to FIG. 9. Data associated with the objects (e.g. location, semantic information, properties, etc.) can be stored in a variety of data structures such as, e.g., arrays, lists, trees, hashes, graphs, and so on. The index of each stored object, where applicable, may be determined, for example, by the location of the object. For example, the data structure may index the objects by a single coordinate such as the object's distance from a fiducial position (e.g., how far to the left (or right) of the fiducial position, how far from the top (or bottom) of the fiducial position, or how far depth-wise from the fiducial position). In situations where the ARD comprises a light field display that is capable of displaying virtual objects at different depth planes relative to the user, the virtual objects can be organized into multiple arrays located at different fixed depth planes. In some implementations, the objects in the environment may be expressed in a vector form, which may be used to calculate the position and movements of a virtual object. For example, an object may have an origin point, a down vector in the direction of gravity, and a forward vector in the direction of the surface normal of the object. For example, the surface normal of a display (e.g., a virtual TV) may indicate the direction from which displayed images can be viewed (rather than the direction from which the back of the display can be seen). The AR system may calculate the difference between components of the two vectors and thereby determine the spatial relationship between the objects associated with the two vectors. The AR system may also use this difference to calculate the amount of movement one object needs to make to be on top (or inside) of the other object.

Examples of Moving a Virtual Object

A user can interact with a subset of the objects in the user's FOR. This subset of objects may sometimes be referred to as interactable objects. The user can interact with the interactable objects by performing user interface operations such as, e.g., selecting or moving the interactable objects, actuating menus associated with the interactable objects, selecting operations to be performed using the interactable object, etc. As is apparent in an AR/VR/MR world, movements of virtual objects do not refer to actual physical movements of the virtual object, since the virtual objects are computer-generated images and not physical objects.

The user may perform various user interface operations using head pose, eye pose, body pose, voice commands, or hand gestures on a user input device, alone or in combination. For example, the user may interact with the interactable objects by using hand gestures to actuate a user input device (see e.g. user input device 466 in FIG. 4), such as, e.g., clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device, alone or in combination. The user may also interact with interactable objects using head, eye, or body pose, such as, e.g., gazing or pointing at an object for a period of time, titling the head, waving at the object, etc.

Figure 14A:
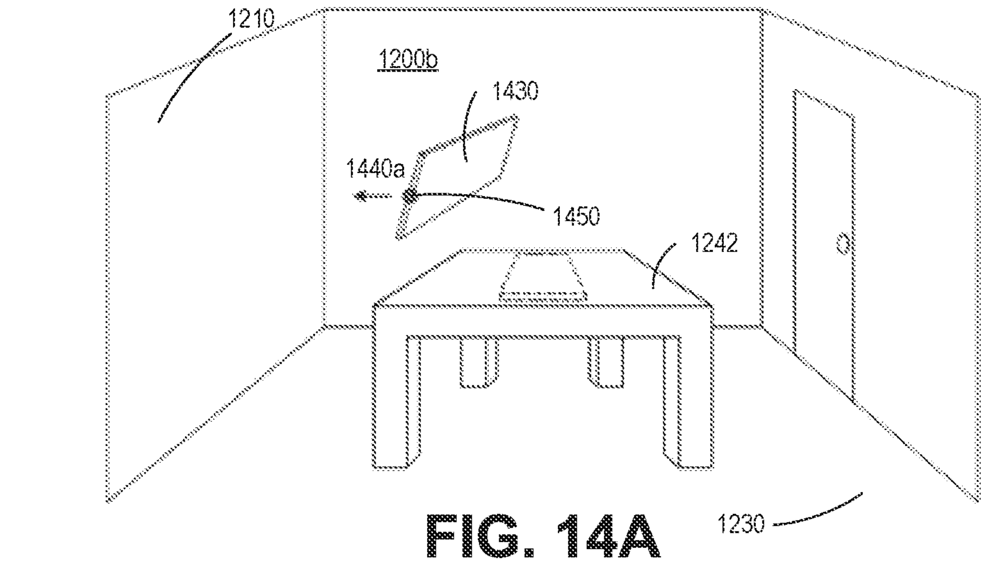
FIGS. 14A, 14B, 14C, and 14D illustrate an example of moving a virtual object from a table to a wall.

In some implementations, the AR system may provide a focus indicator (such as the focus indicator 1450 shown in FIGS. 14A-4D and FIGS. 15A-15H) indicating a position of the target object (see e.g. focus indicator in FIG. 14A). The focus indicator may also be used to show the current position of the user input device or a user's pose (see e.g. focus indicator in FIG. 15D). In addition to or as an alternative to providing an indication of the position, the focus indicator can also provide an indication of the orientation of the target object, the user input device, or the user's pose. For example, the focus indicator can comprise a halo, a color, a perceived size or depth change (e.g., causing the target object to appear closer and/or larger when selected), a graphical representation of a cursor (such as a reticle), or other audible, tactile, or visual effects which draw the user's attention. The focus indicator can appear as 1D, 2D, or 3D images which may include still frame images or animations.

As an example of presenting a focus indicator by the AR system, when a user is staring at a blank wall, the AR system may project a virtual cone or ray on the wall indicating the user's current direction of gaze. As another example, a user may actuate a user input device to indicate that he wants to interact with an object in his environment. The AR system may assign a focus indicator to that object so that the user can more readily perceive the object. As the user changes his pose or actuates the user input device, the AR system may transport the focus indicator from one location to another.

Examples of Snapping and Orienting a Virtual Object

As described herein, because the user can move and rotate the virtual objects in multiple directions, the user may sometimes find it difficult to precisely position and orient the virtual objects. To reduce user fatigue and provide an improved AR device (ARD) with which the user is interacting, the ARD can automatically reposition a virtual object with respect to a destination object in the environment. For example, the ARD can automatically attach (also referred to as "snap") a virtual object to another virtual or physical object in the environment when the virtual object is within a threshold distance from the virtual or physical object. In addition to or in alternative to snapping the virtual object to a destination object, the ARD can automatically change the position or orient the virtual object when the virtual object is in the proximity of the destination object. For example, the ARD can rotate the virtual object such that the normal of the virtual object is facing the user. As another example, the ARD can align the boundary of a virtual image with that of a physical book such that the virtual object can appear to be part of the physical book.

The AR system can reposition the virtual object into an appropriate position or orientation based on affordances of the virtual object or the target object. An affordance comprises a relation between the object and the environment of the object which affords an opportunity for an action or use associated with the object. The affordance may be determined based on, for example, the function, the orientation, the type, the location, the shape, or the size of the virtual object or the destination object. The affordances may also be based on the environment in which the virtual object or the destination object is located. The affordance of a virtual object may be programmed as part of the virtual object and stored in the remote data repository 280. For example, the virtual object may be programmed to include a vector which indicates the normal of the virtual object.

For example, an affordance of a virtual display screen (e.g., a virtual TV) is that the display screen can be viewed from a direction indicated by a normal to the screen. An affordance of a vertical wall is that objects can be placed on the wall (e.g., "ha n g" on the wall) with their surface normal parallel to a normal to the wall. The user can use the AR system to move a virtual display close to a wall and, when sufficiently close to the wall, the AR system can cause the virtual display to automatically snap onto the wall, with the display normal parallel to the wall normal, without further user input. An additional affordance of the virtual display and the wall can be that each has a top or a bottom. When snapping the virtual display onto the wall, the AR system can automatically orient the virtual display so that the bottom of the virtual display is oriented toward the bottom of the wall (or the top of the display is oriented toward the top of the wall), thereby ensuring that the virtual display does not present images that are upside down.

In some situations, in order to reposition the virtual object, the ARD can also change other characteristics of the virtual object. For example, the size or shape of the virtual image may not be the same as the physical book. As a result, the ARD can change the size or the shape of the virtual image to match that of the physical book to align the boundary of the virtual image with that of the physical book. The ARD may (additionally or alternatively) reposition other nearby virtual objects to provide sufficient space for the repositioned virtual object.

In effect, the AR system respects the affordances of physical and virtual objects and positions or orients a virtual object relative to other physical or virtual objects based at least partly on their respective affordances. More details on these features are described below.

Examples of Automatically Attaching a Virtual Object to a Physical Object

Figure 12A:
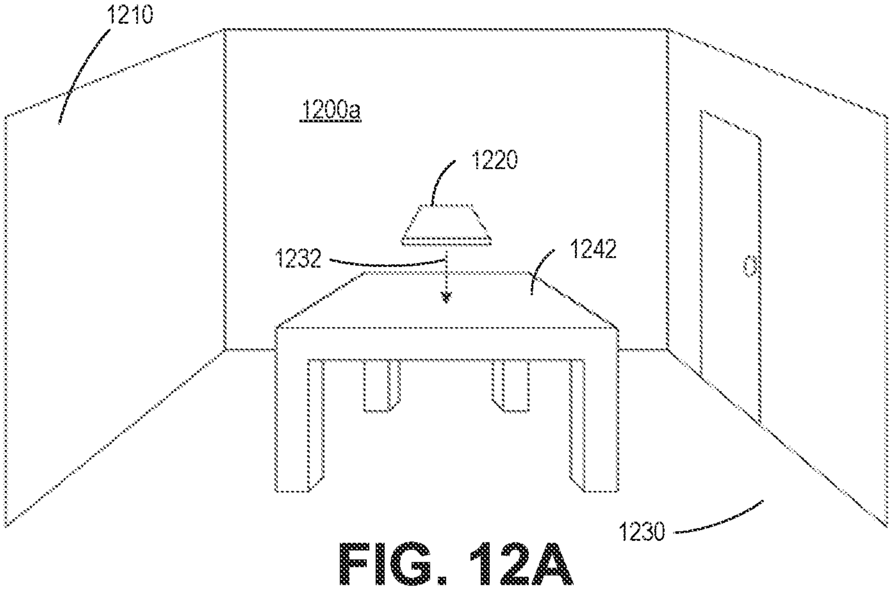
FIGS. 12A and 12B illustrate an example of automatically attaching a virtual object to a table.
Figure 12B:
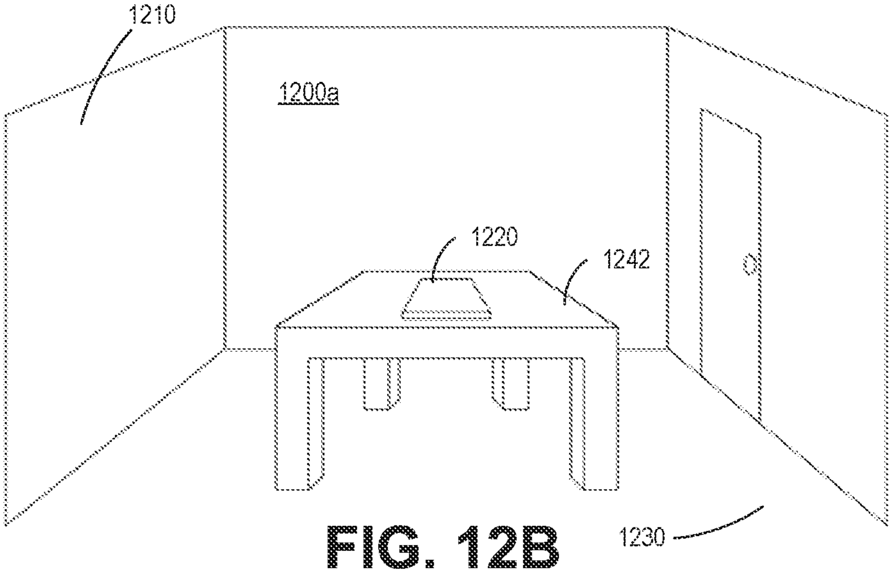

FIGS. 12A and 12B illustrate an example of attaching a virtual object to a table. As shown in FIG. 12A, a virtual book 1220 is initially floating above the table 1242 in the room 1200*a*. The user may have previously moved the book 1220 from an initial position to the position above the table (as shown in FIG. 12A). The user can provide an indication of placing the virtual book 1220 onto the table 1242 by actuating a user input device. For example, the user can select the virtual book 1220 by clicking his totem and pointing his totem at the table 1242 indicating that the virtual book 1220 needs to be placed on the table 1242. The AR system can move the virtual book 1220 to the table 1242 without requiring the user to drag the book to the table 1220. As another example, the user may look toward a destination position on the table where the book should be placed, the AR system can determine the destination position based on head pose or eye gaze, where the AR system can use IMUs to acquire data on the head pose or use eye-tracking cameras to determine the user's direction of gaze. The AR system can automatically place the virtual book 1220 at the destination position on the table 1242 when the user actuates a totem. In some implementations, the user does not need to indicate a destination object, such as the table 1242 or the wall 1210, to which the target object is moved, because the AR system can simulate an attractive force that acts to pull the virtual object onto the target object. For example, when the user selects the virtual book 1220, the AR system can simulate a gravitational effect for the virtual book 1220, where the virtual book 1220 is moving in the downward direction 1232. The AR system can automatically identify the table 1242 as the destination object because it is the first object that is on the path of the virtual book 1220 in a downward movement (as indicated by the arrow 1232). Accordingly, the virtual book can appear to be dropped onto the table 1242 as if it were a physical book.

The AR system can determine parameters for repositioning of the virtual book 1220 and calculate values of the parameters based on affordances of the virtual book, the environment (e.g., the room 1200*a*), or the destination object. Some example parameters of the movement can include an amount of the movements (e.g., a distance or trajectory travelled), a speed of the movement, an acceleration of the movement, or other physics parameters.

The AR system can calculate the amount of movements for the virtual book 1220 based on the position of the virtual book 1220 and the position of the table 1242. For example, the AR system may attach vectors to physical objects and virtual objects in the room. The vectors may include location and direction information of the physical and the virtual objects. The vector for the virtual book 1220 may have a component in the direction of gravity (e.g., the direction 1232). Similarly, a vector for the surface of the table 1242 may also have a component indicating its current location in the direction of gravity. The AR system can obtain the difference between the position of the surface of the table 1242 and the position of the virtual book 1220 in the direction of the gravity. The AR system can use this difference to determine how far downward the virtual book 1220 should be moved. The vector can also include information on size of the gravity. The magnitude of the gravity (e.g., a gravitational acceleration) may change based on the user's physical or virtual environment. For example, when a user is at home, the gravity may be set at the Earth's value of 9.8 m/s2 (1 "g"). However, a user may play a game using the AR system which can present a virtual environment in the game. As an example, if the virtual environment is the moon, the magnitude of the gravitational acceleration may be 1/6 "g" and if the virtual environment were Jupiter, the magnitude of the gravitational acceleration may be 2.5 "g".

To provide improved user experience with the AR system, the AR system can simulate the movement of the virtual book 1220 from the FIG. 12A to 12B using various laws of physics as if the virtual book 1220 were a physical object. For example, the downward movement (as indicated by the arrow 1232) of the virtual book 1220 can be based on a freefall motion. The freefall motion can be combined with other forces (such as air resistance) in the user's environment to provide a realistic user experience. As another example, the room 1200*a* may have an open window. When a gust of wind blows into the room 1200*a*, the AR system can simulate the effect of the wind by automatically flipping the pages of the virtual book 1220.

Continuing with this example in FIGS. 12A and 12B, an affordance of a table is that it can support objects on its surface, so the virtual book 1220 drops onto the top of the table 1242. Thus, when simulating the effect of gravity, the AR system, does not display the virtual book 1220 on the floor 1230 because the AR system respects the affordance of the table that objects do not pass through tables. The table 1242 will block the virtual book 1220 from continuing to move in the direction of gravity as if the virtual book 1242 were a physical book.

In some situations, only a portion of the table 1242 is on the path of the downward movement of the virtual book 1220. As a result, a portion of the virtual book 1220 may extend beyond the surface of the table 1242. The AR system can determine whether the centroid of the virtual book 1220 is on the surface of the table 1242. If the centroid of the virtual book 1220 does rest on the surface of the table 1242, the AR system can display the virtual book 1220 on the table 1242. If the centroid of the virtual book 1220 is outside of the table's 1242 surface, the AR system can determine that the virtual book 1220 will not stay on the table 1242 and can display the virtual book 1220 on the floor instead.

As another example, the virtual object may be a virtual tennis ball whose affordance includes bouncing off a hard surface. Thus, when the virtual tennis ball hits the table 1242, the AR system can show that the virtual tennis ball bounces off the table 1242 and lands on the floor 1230.

Additional affordances of virtual objects (e.g., books) and tables are that a normal to the object should be parallel to a normal to a table (e.g., a virtual book lies flat on the table). The AR system can automatically orient the virtual book 1220 appropriately so that it appears to the user to lie flat on the table 1242 as shown in FIG. 12B.

Besides moving a virtual object in the direction of gravity, the AR system can also move the virtual object in other directions. For example, the user may want to move a note to the wall. The user can point in the direction of the wall 1210 (e.g., with a hand or totem). Based on the direction indicated by the user, the AR system can use the outward-facing imaging system and/or world models to identify a surface of the wall 1210 and automatically "fly" the note to the wall (see, e.g., the example scenes 1300*a*, 1300*b*, 1300*c*, and 1300*d* shown in FIGS. 13A-13D). In other implementations, objects on the wall may have an affordance such that they could attract the note. For example, an object on the wall may represent a surface to which notes are typically attached (e.g., a magnetic note board on which magnetic notes can be attached or a cork note board to which notes can be pinned). The AR system can identify that a wall object has a "stickiness" affordance (e.g., a magnetic or cork note board) and the virtual note has a corresponding stickiness affordance (e.g., the note is magnetic or pinnable). The AR system can automatically attach the virtual note to the wall object.

As described with reference to FIG. 7, semantic information can be attached to physical objects, virtual objects, physical environments, and virtual environments. The semantic information can include affordances. For example, the AR system can assign physical attributes to a virtual object, such as e.g., the following non-exclusive, illustrative attributes: mass, density, diameter, hardness (or softness), elasticity, stickiness, electromagnetic attributes (e.g., charge, conductivity, magnetic attributes), phase (e.g., solid, liquid, or gas), and so forth. The AR system can also assign physical attributes to a virtual environment, such as gravity, air resistance, etc. The values of the assigned attributes can be used to simulate interactions with the virtual object using various laws of physics. For example, the movement of the virtual object may be based on forces exerted to the virtual object. With reference to FIGS. 12A and 12B, the movement of the virtual book 1220 may be determined based on forces calculated using the gravity and the air resistance of the room 1200*a*, and the mass of the virtual book 1220.

Examples of Virtual Copying and Pasting

In some embodiments, rather than reposition a virtual object to a target destination object, the AR system can replicate the virtual object and move the replicated virtual object to a destination object or a location in the environment. As one example, the AR system can present virtual menus to the user by which the user can select one or more items from the virtual menu (e.g., using a totem or head or eye pose). The AR system can automatically place an item selected from the virtual menu in an appropriate place based on affordances of the selected item and the objects in the user's environment. For example, the virtual menu may present to the user items including a virtual TV, a virtual audio player, a virtual game, etc. The user may select the virtual TV. The AR system can copy the virtual TV from the menu into a clipboard. The user can look around the environment to find a target location where the user wants the virtual TV to be placed by the AR system. When the user finds the target location, the user may actuate the user input device (e.g., a totem) to confirm selection of the target location, and the AR system can automatically display the virtual TV at the desired location. The AR system can display the virtual TV based on the affordances of the TV and the target location. For example, if the desired location is on a vertical wall, the AR system can display the virtual TV as if it were hanging flat against the wall. As another example, if the target location is on horizontal table, the AR system can display the virtual TV as if it were lying flat on the table. In both of these examples, the AR system orients the virtual TV (which has a normal indicating the direction from which the TV can be viewed) such that the normal of the virtual TV is aligned with a normal to the target location, namely, the wall normal or the table normal.

In some situations, the virtual object may not be able to be placed at the target location selected by the user. For example, a user may select a table surface to place a virtual note. However, the table surface may have already been covered by other documents, and therefore the virtual note cannot be placed on the table surface. The AR system can simulate a repulsive force such as, e.g., a repulsive spring force, which will prevent the virtual note from being placed onto the table surface.

Accordingly, such embodiments of the AR system can copy a virtual object and paste it in the desired location with minimal user interaction, because the AR system knows about the affordances of the virtual object as well as the other objects in the user's environment. The AR system can utilize these affordances to place virtual objects in their natural position and/or orientation in the user's environment.

Examples of Automatically Pivoting a Virtual Object

Figures 13A, 13B, 13C, 13D:
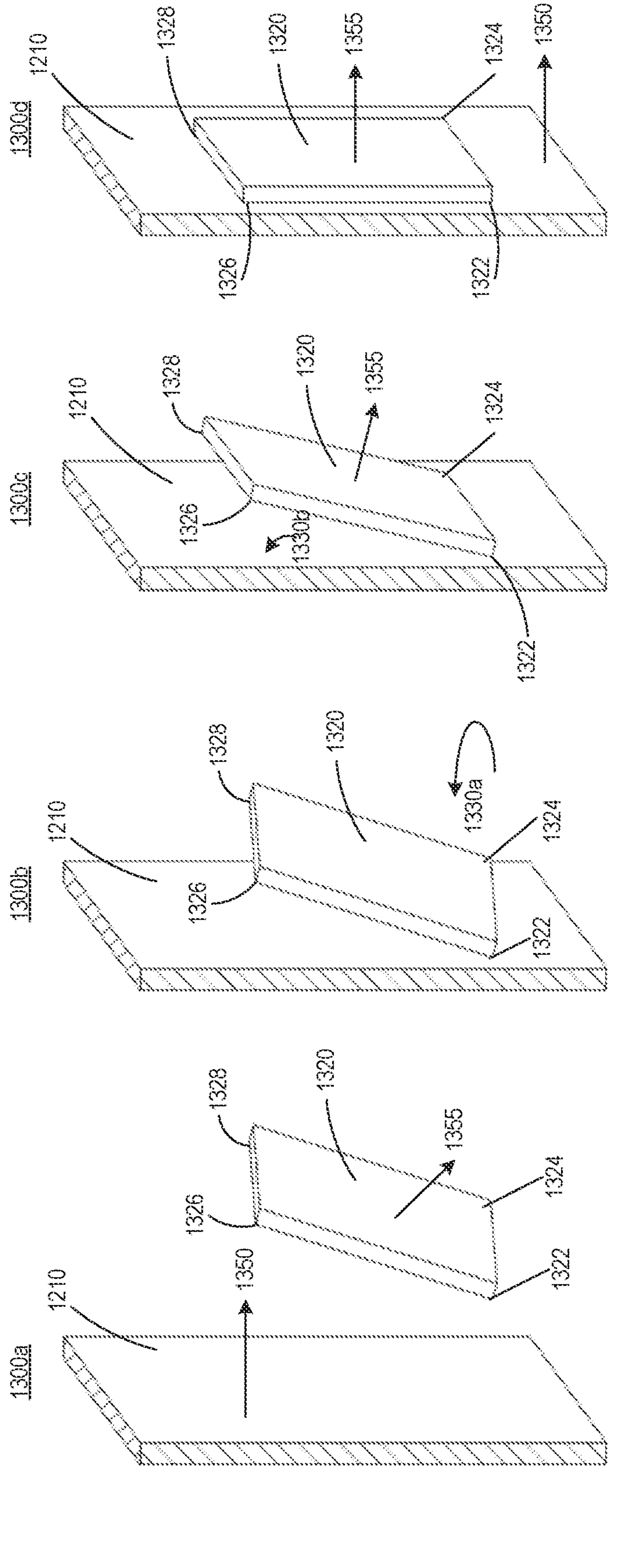
FIGS. 13A, 13B, 13C, and 13D illustrate an example of automatically orienting a virtual object when a portion of the virtual object touches a wall.

FIGS. 13A-13D show automatically adjusting the position and orientation of a virtual object 1320 when the virtual object 1320 is close to a wall 1210. The virtual object 1320 has 4 corners 1326, 1328, 1322, and 1324. Once the AR system determines that the virtual object 1320 touches the wall 1210 (e.g., the corner 1322 touches the wall as shown in FIG. 13B), the AR system can reorient the virtual object 1320 so that the virtual object 1320 appears to be aligned with the orientation of the wall 1210, e.g., the object normal 1355 becomes parallel to the wall normal 1350 as shown in FIG. 13D. The movements for reorienting the virtual object 1320 may be along multiple axes in the 3D space. For example, as shown in FIGS. 13B and 13C, the AR system can pivot the virtual object 1320 in the direction of 1330*a*, and as a result, the corner 1324 also touches the wall 1210 as shown in FIG. 13C. To further align the virtual object 1320 with the wall 1210, the AR system can pivot the virtual object 1320 in the direction of 1330*b* shown in FIG. 13C. Accordingly, the top corners and 1328 of the virtual object 1320 also touch the wall as shown in FIG. 13D. In some cases, the virtual object 1320 may also have an affordance that its natural orientation on the wall 1210 is to hang horizontally (e.g., a virtual painting). The AR system may use this affordance to orient the virtual object 1320 appropriately on the wall 1210 (e.g., so that a virtual painting appears to hang properly from the wall rather than at an angle).

The AR system can reorient the virtual object 1320 by making the surface normal 1355 of the virtual object 1320 parallel to the surface normal 1350 of the wall 1210 rather than anti-parallel to the normal 1350. For example, only one side of a virtual TV screen may be configured to display videos or only one side of a virtual painting may be configured to display the painting. Accordingly, the AR system may need to flip the virtual object so that the side with content is facing the user (instead of facing the wall).

Examples of Snapping and Re-Orienting when a Virtual Object is within a Threshold Distance of Another Object A user can move a virtual object to another location, for example, by dragging the virtual object using the user input device 466. When the virtual object is close to a destination object, the AR system may automatically snap and orient the virtual object so that the user does not have to make minor adjustments to align the virtual object with the destination object.

In FIGS. 14A-14D, the user of the ARD is moving a virtual object from a table to a wall. The virtual object 1430 may be a virtual TV screen. In FIG. 14A, the virtual TV screen 1430 in the room 1200*b* initially was on top of the table 1242 (as shown by dashed lines on the table 1242) and is being moved to the wall 1210. The user can select the virtual screen 1430 and move the virtual screen 1430 in the direction 1440*a* (e.g., toward the desired destination position on the wall 1210). The AR system may show a visible focus indicator 1450 on the virtual screen 1430 indicating the current position of the virtual screen 1430 and indicating that the user has selected the screen 1430.

The AR system can monitor the positions of the virtual screen 1430 as the user moves the virtual screen 1430. The AR system can begin to automatically snap and orient the virtual screen 1430 when the distance between the virtual screen 1430 and the wall 1210 is less than a threshold distance apart. The AR system may set the threshold distance such that the AR system can start automatically attaching and orienting the virtual screen 1430 when at least a portion of the virtual screen touches the wall 1210, as described with reference to FIGS. 13A-13D. In some implementations, the threshold distance may be sufficiently large such that the AR system begins to automatically attach and/or orient the virtual screen 1430 to the wall 1210 before the any portion of the virtual screen 1430 touches the wall. In these implementations, the AR system may simulate a magnetic effect between the wall and the virtual object. For example, when the virtual screen 1430 is sufficiently close (such as smaller than the threshold distance), the object is automatically attracted to the wall without further efforts from the user.

The distance between the virtual screen 1430 and the wall 1210 may be measured in a variety of ways. For example, it may be calculated based on the displacement between the center of the gravity of the virtual screen 1430 and the surface of the wall 1210. In some embodiments, when the objects are associated with vectors describing the positions of the objects, the AR system can calculate the Euclidean distance using the vector for the virtual screen 1430 and the vector for the wall 1210. The distance may also be calculated based on a component of the vector. For example, the ARD may calculate the positional difference between the vector and the virtual screen 1430 in the horizontal axis as the distance.

The threshold distance can depend on affordances relating to the virtual object. For example, the virtual screen 1430 is associated with a size (e.g., a horizontal size, of vertical size, a thickness, a diagonal size, etc.), and the threshold distance may be a fraction of the size. As an example, if the threshold distance is approximately equal to the vertical size of the screen, the AR system may begin to orient the screen towards its destination position and orientation when the screen becomes within the vertical size distance from the wall. As another example, if the threshold distance is smaller than the vertical size of the screen, the AR system may not begin to orient the virtual screen 1430 until the virtual screen 1430 gets much closer to the wall. In various implementations, the threshold distance can be set by the user or can be set to default values (e.g., such as the size of the object). The threshold distance may change based on the user's experience with the AR system. For example, if the user finds that small threshold distance leads to rapid reorientation of the virtual objects and is distracting, the user may reset the threshold distance to be larger so that the reorientation occurs more gradually over a greater distance.

Figure 14B:
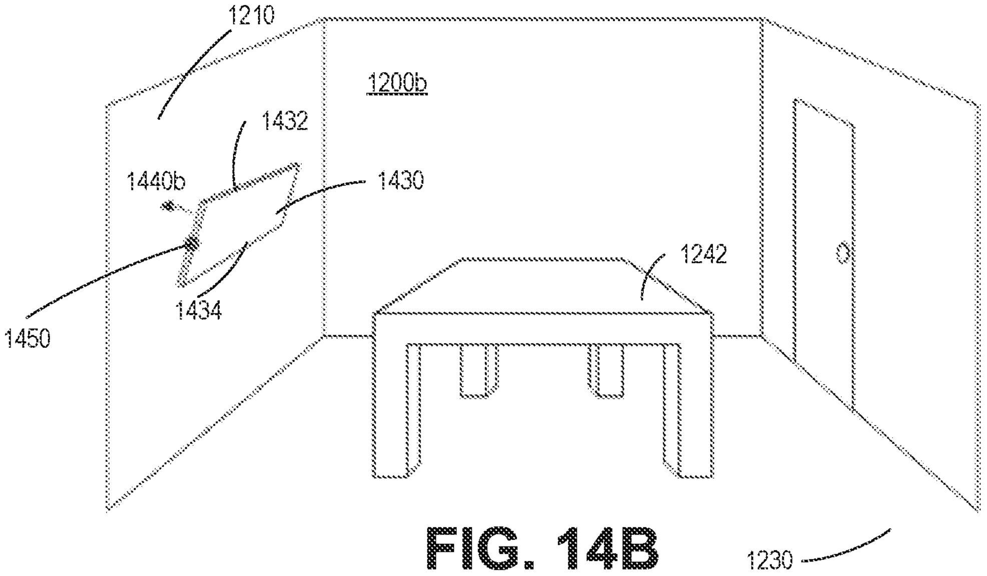

When the virtual screen 1430 is not parallel to the wall, the AR system may use the portion of the virtual screen 1430 that is closest to the wall (such as the bottom portion of the virtual screen 1430 shown in FIG. 14B) as an endpoint when calculating the distance. Using this method, when the distance becomes sufficiently small or zero, the AR system can detect that at least a portion of the virtual screen 1430 has touched the wall 1210. However, if the distance is calculated based on the displacement between the wall 1210 and the center of gravity of the virtual screen 1430, the distance may be greater than 0 (see FIG. 14B) when the AR system detects the collision. This is because when the virtual screen 1430 is not parallel to the wall 1210, a portion of the virtual screen 1430 may reach the wall 1210 before the center of the gravity of the virtual screen 1430 reaches the wall 1210.

In various implementations, the virtual object may have an affordance that only one surface of the virtual object displays content (e.g., a TV screen or a painting) or has a texture that is designed to be visible to the user. For example, for a virtual TV object, only one surface of the object may act as a screen and display content to the user. As a result, the AR system may orient the virtual object so that the surface with the content faces the user instead of the wall. For example, with reference to FIGS. 14A, 14B, and 14C, the surface normal of the virtual screen 1430 may initially face the ceiling (instead of the table) so that the user can see the content of the virtual screen 1430 when he stands in front of the table. However, if the user simply lifts the virtual screen 1430 and attaches it to the wall 1210, the surface normal may face the wall instead of the user. As a result, the user may see the back surface of the virtual screen 1430 without seeing the content. To make sure the user can still view the content when the virtual screen 1430 is moved to the wall 1210, the AR system can rotate the virtual screen 1430 180 degrees around an axis so that the surface with the content can face the user (not the wall). With this rotation, the side 1434 which was the bottom side of the virtual screen 1430 in FIG. 14B becomes the top side in FIG. 14C while the side 1432 which was the top side of the virtual screen 1430 in FIG. 14B becomes bottom side in FIG. 14C.

Figure 14C:
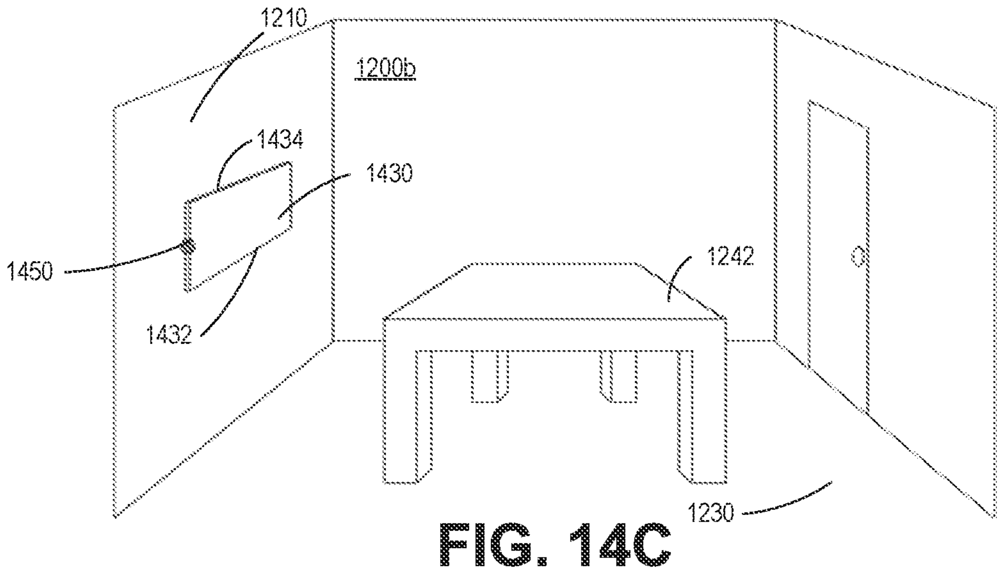
Figure 14D:
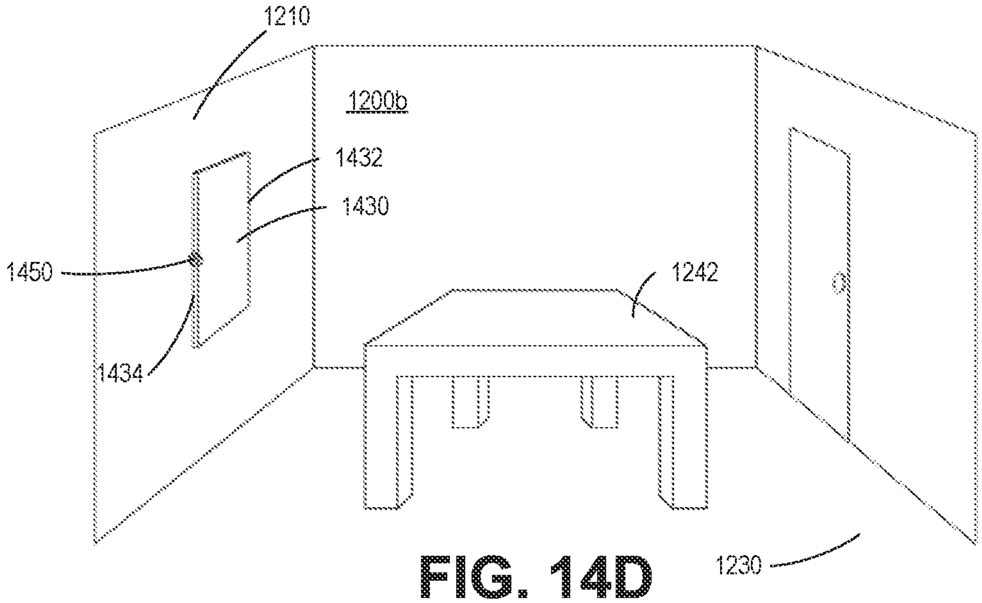

In addition to or in alternative to flipping the virtual object along an axis as described with reference to FIG. 14C, the AR system may also rotate the virtual object around other axes such that the virtual object retains the same orientation as before it was moved to the destination location. With reference to FIGS. 14A and 14D, the virtual TV screen 1430 (and its contents) may initially be at a portrait orientation on the table 1242. However, after the virtual TV screen 1430 is moved to the wall 1210 as shown in FIGS. 14B and 14C, the virtual TV screen is oriented in a landscape orientation. To retain the same user experience as when the virtual screen 1430 is on the table 1242, the AR system may rotate the virtual TV screen 1430 90 degrees so that the virtual TV screen 1430 appears to be in the portrait orientation (as shown in FIG. 14D). With this rotation, the side 1434 which was shown as the top of the screen 1430 in FIG. 14C becomes the left side of the screen 1430 in FIG. 14D while the side 1432 which was shown as the bottom side of the screen 1430 in FIG. 14C becomes the right side of the screen 1430 in FIG. 14D.

Figure 15A:
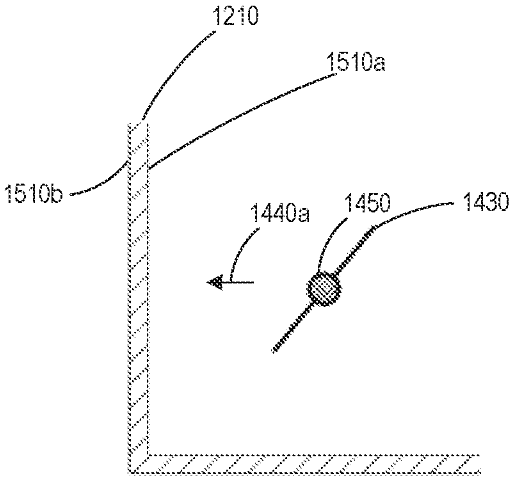
FIGS. 15A, 15B, and 15C illustrate an example of attaching and orienting a virtual object from a side view.
Figure 15B:
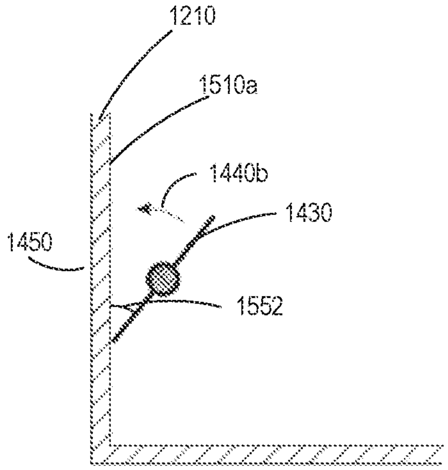
Figure 15C:
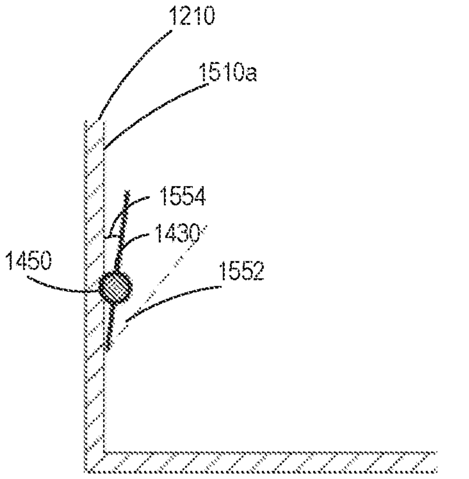

FIGS. 15A, 15B, and 15C illustrate side views of an example of attaching and orienting a virtual object. In this example, the virtual object is depicted to be a planar object (e.g., a virtual screen) for purpose of illustration, but the virtual object is not limited to a planar shape. Similar to FIG. 14A, the virtual screen 1430 in FIG. 15A is moving towards the wall 1210 in the direction of 1440*a*. The AR system can display the focus indicator 1450 to indicate a position associated with a user (e.g., such as the user's gaze direction, or a position of the user's user input device 466). In this example, the focus indicator 1450 is on the virtual screen 1430 which can indicate a selection of the virtual screen 1430. The virtual screen 1430 is at an angle 1552 with the wall 1210 (shown in FIG. 15B). When the virtual screen 1430 touches the surface 1510*a* of the wall 1210 as shown in FIG. 15B, the AR system can rotate the virtual screen 1430 in the angular direction 1440*b*. As a result, as shown in FIG. 15C, the angle formed between the virtual screen 1430 and the surface 1510*a* of the wall 1210 is decreased from the angle 1552 to the angle 1554, and in FIG. 15D, the angle has been reduced to zero, because the screen 1430 is flat against the wall 1210. In this example, the screen 1430 remains on the wall (due to the "stickiness" of the wall) even after the user has moved slightly away from the wall 1210 (where the focus indicator 1450 is no longer on the virtual object 1430).

Although the example figures described herein show that the reorientation of the virtual object occurs after the virtual object touches the wall, it should be noted that the examples here are for illustration purposes and are not intended to be limiting. The reorientation can happen before the virtual object touches a physical object. For example, the AR system can calculate the surface normal of the wall and the virtual object, and can orient the virtual object while the virtual object is moving towards the wall. In addition, although the examples provided herein show that the bottom portion of the virtual object touches the wall first, it should be noted that any other portions of the object may also touch the wall first. For example, when the virtual object is parallel to the wall, the whole virtual object may collide with the wall at the same time. As another example, when the object is a 3D cup, the cup holder can collide with the wall before any other parts of the cup.

Simulated Attractive Effect Between a Virtual Object and a Physical Object

As described herein, the AR system can simulate the effect of an attractive force between a virtual object and a physical or virtual object, such as a wall or a table (e.g., gravity in FIGS. 12A-12B or a magnetic attraction or a "stickiness" as shown in FIGS. 13A-13D or 14A-14D). As the distance between the virtual object and the physical object becomes less than a threshold, the AR system can automatically attach the virtual object to the physical object as if the two objects were attracted together due to the attractive force (e.g., the attraction of opposite poles of magnets or the downward pull of gravity).

In some cases, the AR system may utilize multiple attractive forces, which may more accurately represent trajectories of physical objects. For example, with reference to FIGS. 14A-14B, a user who wants to move the virtual screen 1430 from the table 1242 to the wall 1210 may make a gesture to toss the virtual screen 1430 onto the wall 1210. The AR system can utilize a magnetic attractive force to attach the screen 1430 to the wall 1210 as described above. Additionally, the AR system can utilize a downward gravity force to represent an arc-like trajectory of the screen 1430 as it moves toward the wall 1210. The use of one or more attractive forces by the AR system can cause virtual objects to appear to move and interact with other objects in the user's environment in a more natural way, because the virtual objects act somewhat similarly to the movement of physical objects. This can advantageously lead to a more natural and realistic user experience.

In other situations, a user may want to move a virtual object away from an object to which the virtual object is currently attached. However, sometimes, the AR system may not be able to differentiate whether a movement of the user indicates the intent of detaching the virtual object from the user interactions of the virtual object when the virtual object is attached to the wall. As an example, while a user is playing a game using a virtual screen attached to the wall, the user may need to move his totem around to find or interact with friends or enemies. This type of game movement may coincide with a type of movement for detaching the virtual object from the wall. By only detaching the virtual screen if the user's movements are sufficiently above a suitable threshold, the virtual screen will not be inadvertently detached during gameplay. Additionally, the user usually cannot keep his pose or the user input device still for long periods of time. As a result, the virtual object may accidentally be detached by minor movements of the user when the user does not intend to detach the virtual object. Accordingly, by only detaching the virtual object if the user's movements are sufficiently above a suitable threshold, minor movements or twitches by the user will not inadvertently detach virtual objects from their intended location or orientation.

Figure 15D:
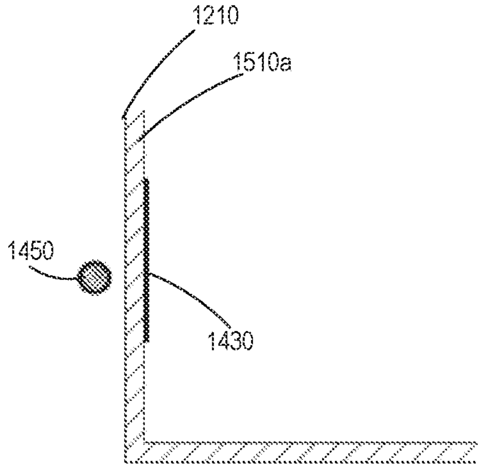
FIGS. 15D and 15E illustrate an example of detaching a virtual object from a wall.
Figure 15E:
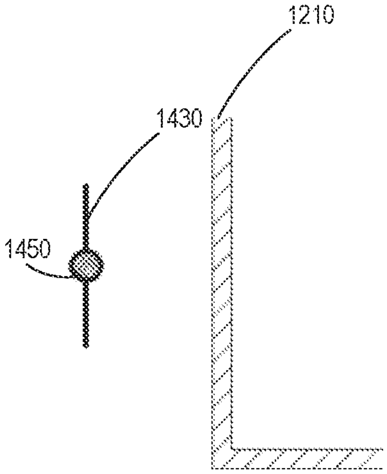

To solve these problems and to improve the AR system, the AR system can simulate an attractive force between the virtual object and the physical object so that the user may not immediately detach the virtual object from the other object unless the change of the user's position is greater than a threshold value. For example, as shown in FIG. 15D, the screen 1430 is attached to the wall 1210. The user can move his user input device such that the focus indicator 1450 is moved away from the wall. However, the virtual screen 1430 may still be attached to the surface 1510*a* due to the simulated attractive effect between the screen and the wall. As the focus indicator moves farther away and exceeds a threshold distance between the screen 1430 and the focus indicator 1450, the AR system may detach the virtual screen 1430 from the wall 1210 as shown in FIG. 15E. This interaction provided by the AR system acts as if there were an invisible virtual string between the focus indicator 1450 and the screen 1430. When the distance between the focus indicator 1450 and the screen 1430 exceeds the length of the virtual string, the virtual string becomes taut and detaches the screen from the wall 1210. The length of the virtual string represents the threshold distance.

In addition to or in alternative to a threshold distance, the AR system can also use other factors to determine whether to detach the virtual object. For example, the AR system may measure acceleration or speed of the user's movements. The AR system may measure the acceleration and the speed using the IMUs described with reference to FIGS. 2 and 4. If the acceleration or the speed exceeds a threshold, the AR system may detach the virtual object from the physical object. In some cases, the rate of change of the acceleration (known as "jerk") can be measured, and if the jerk provided by the user is greater than a jerk threshold, the virtual object is detached. Implementations of the AR system that utilize an acceleration threshold or a jerk threshold may more naturally represent how users detach objects from other objects. For example, to remove a physical object that is stuck onto a wall, a user may grab a portion of the physical object and yank it from the wall. The representation of this yank in the virtual world can be modeled using acceleration and/or jerk thresholds.

In another implementation, the AR system may simulate other physical force such as friction or elasticity. For example, the AR system may simulate the interaction between the focus indicator 1450 and the screen 1430 as if there were a virtual rubber band connecting them. As the distance between the focus indicator 1450 and the screen 1430 increases, the virtual pull of the virtual rubber band increases, and when the virtual pull is greater than a force threshold that represents the stickiness of the wall 1210, the screen 1430 is detached from the wall 1210. In another example, when the virtual object appears on a horizontal surface of a physical object, the AR system may simulate the interaction between a focus indicator and the virtual object as if there were a virtual friction existing between the virtual object and the horizontal surface. The user may drag the focus indicator along the horizontal surface while the AR system may only begin to move the virtual object when the force applied by the user is sufficient to overcome the virtual friction.

Accordingly, in various implementations, the AR system can utilize distance, speed, acceleration, and/or jerk measurements with corresponding thresholds to determine whether to detach a virtual object from another object. Likewise, the AR system can utilize thresholds for the attractive force between objects (which represent stickiness, gravity, or magnetic attraction) to determine how strongly virtual objects are attached to other objects. For example, a virtual object which is intended to be immovably placed on another object may be associated with a very high attraction threshold so that it is very difficult for a user to detach the virtual object. Unlike the physical world where physical objects' properties are set by its weight and so forth, in the virtual world, a virtual object's properties can be changed. For example, if the user intentionally wants to move an "immovable" virtual object, the user may instruct the AR system to temporarily change the virtual object's settings so that its associated thresholds are much lower. After moving the virtual object to a new position, the user can instruct the AR system to reset the thresholds of the virtual object so that it again is immovable.

When the virtual object is detached from the physical object, the orientation of the virtual object can remain the same as when the virtual object is attached to the physical object. For example, in FIG. 15D, when the virtual screen 1430 is attached to the wall, the virtual screen 1430 is parallel to the surface 1510*a* of the wall. Accordingly, as the virtual screen 1430 moves away from the wall in FIG. 15E, the virtual screen 1430 may remain parallel to the wall 1430.

Figure 15F:
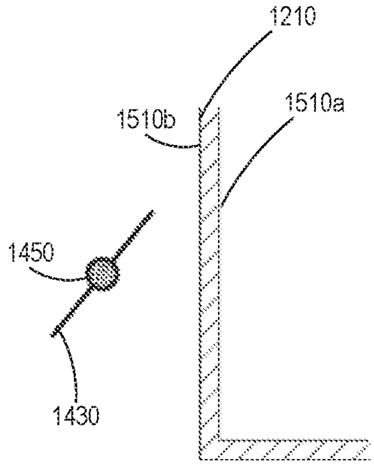
FIGS. 15F, 15G, and 15H illustrate additional examples of attaching and orienting a virtual object from a side view.

In some embodiments, when the virtual object is detached from the wall, the AR system may change the virtual object's orientation back to its original orientation before the virtual object was attached to the wall. For example, as shown in FIG. 15F, when the virtual screen 1430 is detached from the wall 1210, the AR system may revert the orientation of the virtual screen 1430 back to be the same orientation as the one shown in FIGS. 15A and 15B.

Figure 15G:
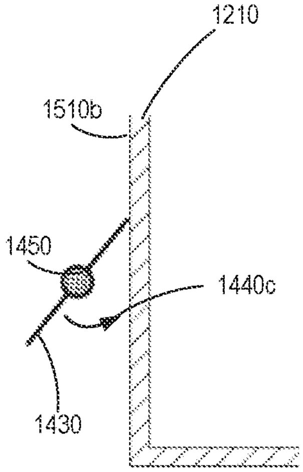
Figure 15H:
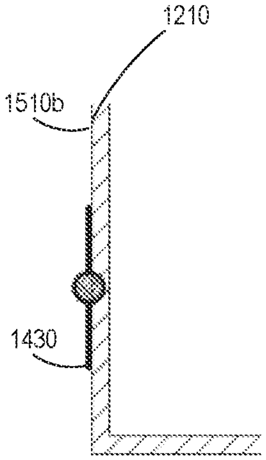

Once the virtual screen 1430 is detached from the wall 1210, the user can move the object 1430 around and re-attach it to the wall (or to another object). As shown in FIGS. 15G and 15H, when the user moves the virtual screen 1430 back to the wall 1210, the virtual object 1430 can be oriented in the direction of 1440*c* and attached to the surface 1510*b* of the wall 1210. Accordingly, as shown in FIG. 15D, the user could reattach the object 1430 to the left-hand side of the wall 1210 (e.g., compare the position of the virtual screen 1430 in FIG. 15D with its position in FIG. 15H).

Although the examples in FIGS. 14A-14D and 15A-15H are described with reference to automatically attaching a virtual object to a wall, the same techniques can also be applied for automatically attaching a virtual object to another object such as a table. For example, the AR system can simulate the effect of a downward gravity force when a virtual book is close to the table and automatically orient and show the virtual book on top of the table without further user efforts. As another example, the user can move a virtual painting to the floor using hand gestures and drop it onto the floor (via virtual gravity). The current position of the user may be indicated by a focus indicator. As the user moves the painting to the floor, the focus indicator can follow the user's position. When the virtual painting is close to a table in the user's environment, however, the virtual painting may be accidentally attached to the table because the table may be on top of the floor. The user can continue moving the focus indicator in the direction of floor with his hand, head, or eye gestures. When the distance between the location of the focus indicator and the table is sufficiently large, the AR system may detach the virtual picture from the table and move it to the location of the focus indicator. The user can then continue moving the virtual picture until it nears the floor, where the AR system can drop it into position under virtual gravity.

Additionally or alternatively, the techniques described herein can also be used for putting a virtual object inside of another object. For example, a user may have a virtual box which contains photographs of the user. When the AR system receives an indication of placing a photograph into the virtual box, the AR system can automatically move the photograph inside of the virtual box and align the photograph with the virtual box.

Example Methods for Automatically Snapping and Orienting a Virtual Object

Figure 16:
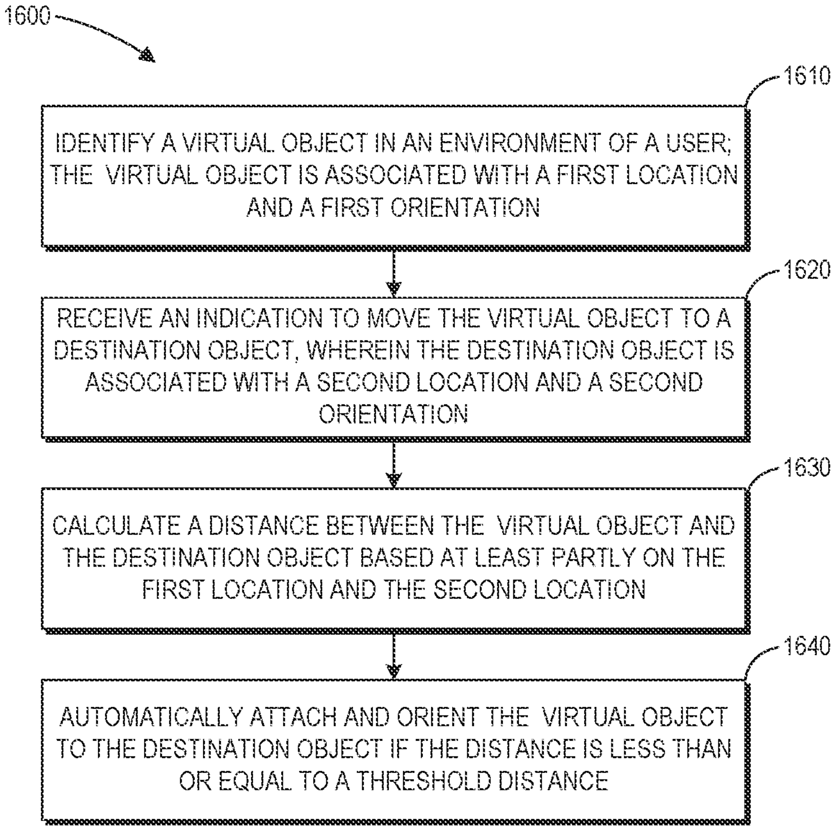
FIG. 16 is an example method for attaching and orienting a virtual object.

FIG. 16 is an example method for attaching and orienting a virtual object. The process 1600 shown in FIG. 16 may be performed by the AR system 200 described with reference to FIG. 2.

At block 1610, the AR system can identify a virtual object in a user's environment that the user wants to interact with. This virtual object can also be referred to as the target virtual object. The AR system can identify the target virtual object based on a pose of the user. For example, the AR system may select a virtual object as a target virtual object when it intersects with the user's direction of gaze. The AR system may also identify the target virtual object when the user actuates a user input device. For example, when user clicks the user input device, the AR system may automatically designate a target virtual object based on the current location of the user input device.

The target virtual object may have a first location and a first orientation. In some embodiments, the location and orientation of the target virtual object may be expressed in a vector form. As the target virtual object moves around, the values in the vectors may be updated accordingly.

At block 1620, the AR system can receive an indication to move the target virtual object to a destination object. For example, the user may point to a table and actuate a user input device indicating the intention of moving the target virtual object to the table. As another example, the user may drag the virtual object in the direction of a wall to place the virtual object to the wall. The destination object can have a location and an orientation. In some implementations, like the target virtual object, the location and the orientation of the destination object may also be expressed in a vector form.

At block 1630, the AR system can calculate a distance between the target virtual object and the destination object based on the location of the target virtual object and the location of the destination object. The AR system can compare the calculated distance with a threshold distance. If the distance is less than the threshold distance, as shown at block 1640, the AR system can automatically orient and attach the target virtual object to the destination object.

In some implementations, the AR system may include multiple threshold distances (or speeds, accelerations, or jerks) where each threshold distance is associated with a type of action. For example, the AR system may set a first threshold distance where AR system can automatically rotate the virtual object if the distance between the target virtual object and the destination object is less than or equal to the threshold distance. The AR system may also set a second threshold distance where the AR system can automatically attach the target virtual object to the destination object when the distance is less than the second threshold distance. In this example, if the first threshold distance is the same as the second threshold distance, then the AR system can simultaneously begin attaching and orienting the target virtual object when the threshold distance is met. If the first threshold distance is greater than the second threshold distance, the AR system may begin to orient the target virtual object before the AR system begins to automatically attach the target virtual object to the destination object. On the other hand, if the first threshold distance is less than the second threshold distance, the AR system may first attach the target virtual object to the destination object, and then orient the target virtual object (such as when a portion of the target virtual object is already attached to the destination object). As another example, the AR system may detach virtual objects if a user movement exceeds a corresponding speed, acceleration, or jerk threshold.

The AR system can orient the target virtual object along multiple axes when orienting the target virtual object. For example, the AR system can rotate the virtual object such that the surface normal of the virtual object is facing the user (instead of facing the surface of the destination object). The AR system can also orient the virtual object such that the virtual object appears to be in the same orientation as the destination object. The AR system can further adjust the orientation of the virtual object so that the user does not have view the content of the virtual object at an uncomfortable angle. In some embodiments, the AR system may simulate the effect of magnetic attraction and/or gravity when attaching the two objects together. For example, the AR system can show the effect of attracting a virtual TV screen to a wall when the virtual TV screen is close to the wall. As another example, the AR system may simulate the free fall motion when a user indicates the intention of putting a virtual book onto a table.

Besides magnetic attraction, stickiness, and gravitational effects, the AR system may also simulate other physical effects as if the virtual object were a physical object. For example, the AR system may assign mass to virtual objects. When two virtual objects collide, the AR system may simulate the effect of momentum such that the two virtual objects may move together for a certain distance after the collision.

Example Methods for Detaching a Virtual Object

Figure 17:
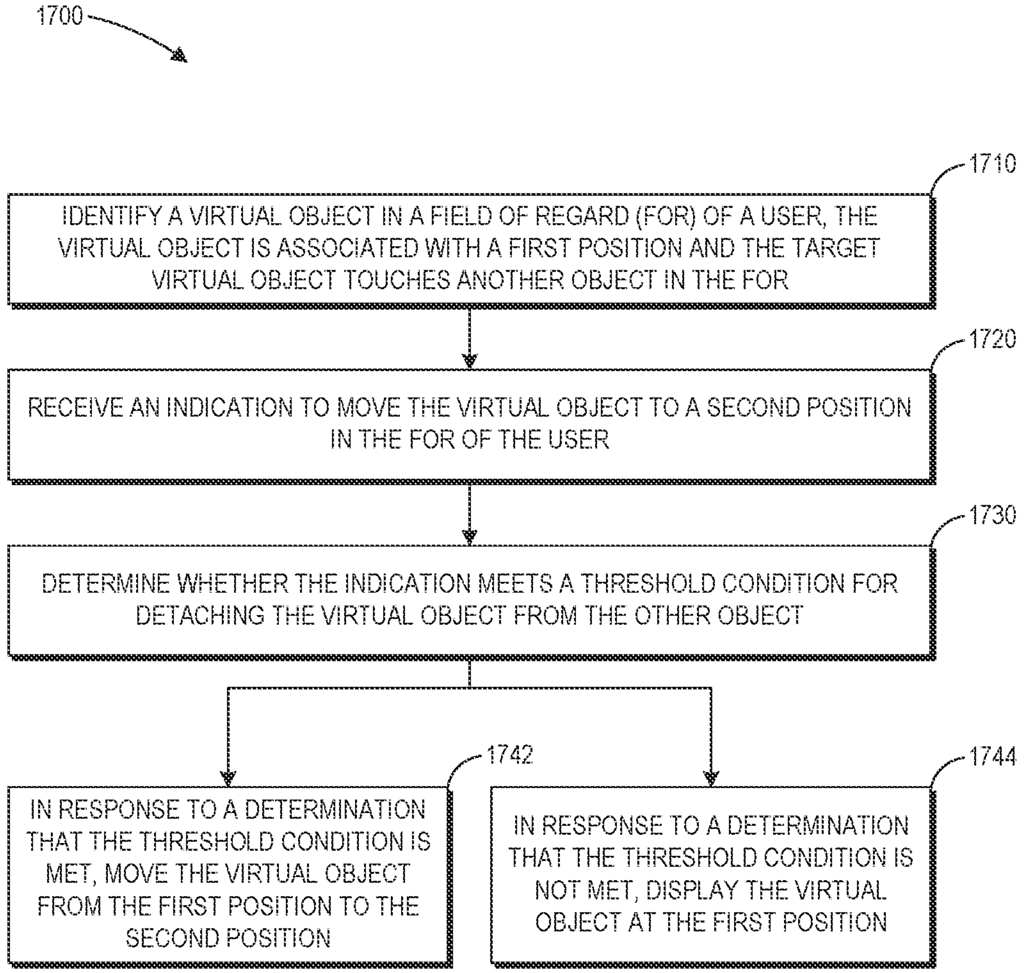
FIG. 17 is an example method for detaching a virtual object from another object in the user's environment.

FIG. 17 is an example method for detaching a virtual object from another object in the user's environment. The process 1700 shown in FIG. 17 may be performed by the AR system described with reference to FIG. 2.

At block 1710, the AR system can identify a target virtual object in a user's field of regard (FOR). The FOR comprises a portion of the environment around the user that is capable of being perceived by the user via the AR system. The target virtual object may be attached to another object in the FOR. The AR system may assign a first position to the target object when it is attached to the other object.

At block 1720, the AR system can receive an indication to move the target virtual object to a second position in the user's FOR. The indication may be a change in the user's pose (such as moving his hand), a movement of the user input device (such as moving the totem), or a hand gesture on the user input device (such as moving along a trajectory on a touchpad).

At block 1730, The AR system can determine whether the indication of movements meets a threshold condition for detaching the target virtual object from the other object. If the threshold condition is met, as shown in block 1742 the AR system may detach the virtual object and move it to the position of the user (e.g., as indicated by a focus indicator). The threshold condition may be based on speed/acceleration of the movement and/or the position change. For example, when the user wants to detach a virtual object from a wall, the AR system can calculate how far away the user has moved his totem from the wall. If the AR system determines that the distance between the totem and the wall meets a threshold distance, then the AR system may detach the virtual object. As an example, when the user moves his totem sufficiently fast, which meets a threshold speed and/or threshold acceleration, the AR system may also detach the virtual object from the wall.

If the AR system determines that the threshold condition is not met, the AR system may not detach the virtual object as shown in block 1744. In some embodiments, the AR system may provide a focus indicator showing the current position of the user. For example, when the threshold condition is not met, the AR system may show the focus indicator at the user's current position while showing the virtual object as still being attached to the other object in the environment.

Although the examples described herein are with reference to moving one virtual object, it should be noted that these examples are not limiting. For example, the AR system may use the techniques described herein to automatically orient, attach, and detach a group of virtual objects from another object in the environment.

Additional Embodiments

In a 1st aspect, a method for automatically snapping a target virtual object to a destination object in a three-dimensional (3D) environment of a user, the method comprising: under control of an augmented reality (AR) system comprising computer hardware, the AR system configured to permit user interaction with objects in the 3D environment of the user, the AR system comprising a user input device: identifying a target virtual object and a destination object in the 3D environment of the user, wherein the target virtual object is associated with a first orientation and a first location and wherein the destination object is associated with a second orientation and a second location; calculating a distance between the target virtual object and the destination object based at least partly on the first location and the second location; comparing the distance with a threshold distance; automatically attaching the target virtual object to a surface the destination object in response to a comparison that the distance is less than or equal to the threshold distance; and automatically orienting the target virtual object to align the target virtual object with the destination object based at least partly on the first orientation and the second orientation.

In a 2nd aspect, the method of aspect 1, wherein identifying the target virtual object and the destination object is based on at least one of the following: a head pose, an eye pose, a body pose, or a hand gesture.

In a 3rd aspect, the method of any one of aspects 1-2, wherein the destination object comprises at least one of: a physical object or a virtual object.

In a 4th aspect, the method of aspect 3, wherein the destination object comprises a wall or a table.

In a 5th aspect, the method of any one of aspects 1-4, wherein the first orientation or the second orientation comprises at least one of: a vertical orientation or a horizontal orientation.

In a 6th aspect, the method of any one of aspects 1-5, wherein calculating the distance comprises calculating a displacement between the target virtual object and the destination object.

In a 7th aspect, the method of any one of aspects 1-6, wherein the threshold distance is zero.

In an 8th aspect, the method of any one of aspects 1-7, wherein automatically orienting the target virtual object to align the target virtual object with the destination object comprises at least one of the following: automatically orienting the target virtual object to cause a surface normal of the target virtual object to face the AR system; automatically orienting the target virtual object to cause a surface normal of the target virtual object to be perpendicular to a surface of the destination object; or automatically orienting the target virtual object to cause a surface normal of the target virtual object to be parallel to a normal of the destination object.

In a 9th aspect, the method of any one of aspects 1-8, further comprising assigning a focus indicator at least one of: the target virtual object or the destination object.

In a 10th aspect, an augmented reality system comprising computer hardware and a user input device, the augmented reality system is configured to perform any one of the methods in claims 1-9.

In an 11th aspect, a method for automatically snapping a target virtual object to a destination object in a three-dimensional (3D) environment of a user, the method comprising: under control of an augmented reality (AR) system comprising computer hardware, the AR system configured to permit user interaction with objects in the 3D environment of the user, the AR system comprising a user input device and a pose sensor configured to measure a pose of the user: identifying a target virtual object in the 3D environment of the user, wherein the target virtual object is associated with a first location and a first orientation; receiving, using the pose sensor, an indication from the user to move the target virtual object to a destination object, wherein the destination object is associated with a second location and a second orientation; calculating a trajectory between the target virtual object and the destination object based at least partly on the first location and the second location; moving the target virtual object along the trajectory towards the destination object; calculating a distance between the target virtual object and the destination object based at least partly on a current location of the target virtual object and the second location; comparing the distance with a threshold distance; automatically attaching the target virtual object to the destination object in response to a comparison that the distance is less than or equal to the threshold distance; and automatically orienting the target virtual object to align the target virtual object with the destination object based at least partly on the first orientation and the second orientation.

In a 12th aspect, the method of aspect 11, wherein the pose sensor comprises at least one of: an outward-facing imaging system, an inertial measurement unit, or an inward-facing imaging system.

In a 13th aspect, the method of aspect 12, further comprising: assigning a focus indicator to a current position of the user, wherein the current position of the user is determined based at least partly on the pose of the user or a position associated with the user input device.

In a 14th aspect, the method of aspect 13, wherein the pose comprises at least one of a head pose, an eye pose, or a body pose.

In a 15th aspect, the method of aspect 14, wherein receiving the indication from the user to move the target virtual object to the destination object comprises: identifying, using the pose sensor, a change in the pose of the user; identifying the destination object based at least partly on the pose of the user; and receiving a confirmation from the user to move the target virtual object to the destination object.

In a 16th aspect, the method of aspect 13, wherein receiving the indication from the user to move the target virtual object to the destination object comprises at least one of: receiving an indication of the destination object from the user input device; or receiving a confirmation from the user to move the target virtual object to the destination object.

In a 17th aspect, the method of any one of aspects 15-16, wherein the confirmation comprises at least one of a change in the pose of the user or a hand gesture on the user input device.

In an 18th aspect, an augmented reality system comprising computer hardware, a user input device, and a pose sensor, the augmented reality system is configured to perform any one of the methods in aspects 11-17.

In a 19th aspect, a method for snapping a target virtual object to a destination object in a three-dimensional (3D)

environment of a user, the method comprising: under control of an augmented reality (AR) system comprising computer hardware, the AR system configured to permit user interaction with objects in the 3D environment of the user: identifying a target virtual object and a destination object in the 3D environment of the user; receiving an indication to attach the target virtual object to the destination object; determining an affordance associated with at least one of the target virtual object or the destination object; automatically orienting the target virtual object based at least partly on the affordance; and automatically attaching the target virtual object to the destination object.

In a 20th aspect, the method of aspect 19, wherein identifying the target virtual object and the destination object is based on at least one of the following: a head pose, an eye pose, a body pose, a hand gesture, or an input from a user input device.

In a 21st aspect, the method of any one of aspects 19-20, wherein the destination object comprises at least one of: a physical object or a virtual object.

In a 22nd aspect, the method of aspect 21, wherein the destination object comprises a vertical surface or a horizontal surface.

In a 23rd aspect, the method of any one of aspects 19-22, wherein receiving the indication to attach the target virtual object to the destination object comprises one or more of the following: detecting a change in a pose of the user; or receiving an indication of the destination object from an user input device.

In a 24th aspect, the method of aspect 23, wherein the pose comprises at least one of: a head pose, an eye pose, or a body pose.

In a 25th aspect, the method of any one aspects 19-24, wherein the affordance is determined based on one or more of the following: a function, an orientation, a type, a location, a shape, a size, or an environment of the target virtual object or the destination object.

In a 26th aspect, the method of any one of aspects 19-25, wherein automatically orienting the target virtual object comprises one or more of: automatically orienting the target virtual object to cause a surface normal of the target virtual object to face the AR system; automatically orienting the target virtual object to cause a surface normal of the target virtual object to be perpendicular to a surface of the destination object; or automatically orienting the target virtual object to cause a surface normal of the target virtual object to be parallel to a normal of the destination object.

In a 27th aspect, the method of any one of aspects 19-26, wherein automatically attaching the target virtual object to the destination object is performed by simulating an attractive force between the target virtual object and the destination object.

In a 28th aspect, the method of aspect 27, wherein the attractive force comprises one or more of the following: gravity or magnetic attraction.

In a 29th aspect, an augmented reality system comprising computer hardware, the augmented reality system is configured to perform any one of the methods in aspects 19-28.

In a 30th aspect, a method for detaching a target virtual object from another object in a three-dimensional (3D) environment, the method comprising: under control of an augmented reality (AR) system comprising computer hardware, the AR system configured to permit user interaction with objects in a field of regard (FOR) of a user, the FOR comprising a portion of the environment around the user that is capable of being perceived by the user via the AR system: receiving a selection, by the user, of a target virtual object, wherein the target virtual object is associated with a first position in the FOR of the user; displaying, to the user, a focus indicator associated with the target virtual object; receiving, from the user, an indication to move the target virtual object; displaying, to the user based at least partly on the indication, the focus indicator at an updated position; calculating a distance between the first position of the target virtual object and the updated position of the focus indicator; comparing the distance with a threshold distance; in response to a comparison that the distance is greater than or equal to the threshold distance, moving the target virtual object from the first position to a second position associated with the updated position of the focus indicator; and displaying, to the user, the target virtual object at the second position.

In a 31st aspect, the method of aspect 30, wherein receiving a selection, by the user, of the target virtual object comprises at least one of the following: detecting a change in a pose of a user; or receiving an input from a user input device.

In a 32nd aspect, the method of any one of aspects 30-31, wherein the other object comprises at least one of: a physical object or a virtual object.

In a 33rd aspect, the method of aspect 32, wherein the other object comprises a wall or a table.

In a 34th aspect, the method of any one of aspects 30-33, wherein receiving an indication to move the target virtual object comprises at least one of: detecting a movement of a user input device; detecting a hand gesture on the user input device; or detecting a change in a pose of the user.

In a 35th aspect, the method of any one of aspects 31-34, wherein the pose of the user comprises: a head pose, an eye pose, or a body pose.

In a 36th aspect, the method of any one of aspects 30-35, wherein calculating the distance comprises calculating a displacement between the first position and the updated position.

In a 37th aspect, the method of any one of aspects 30-36, wherein the threshold distance is specified by the user.

In a 38th aspect, the method of any one of aspects 30-37, wherein displaying, to the user, the target virtual object at the second position comprises: determining an orientation associated with the target virtual object before the target virtual object touches the other object; and displaying to the user the target virtual object with the orientation at the second position.

In a 39th aspect, the method of any one of aspects 1-38, wherein displaying, to the user, the target virtual object at the second position comprises: determining an orientation associated with the target virtual object at the first position; and displaying to the user the target virtual object with the orientation at the second position.

In a 40th aspect, a method for detaching a target virtual object from another object in a three-dimensional (3D) environment, the method comprising: under control of an augmented reality (AR) system comprising computer hardware, the AR system configured to permit user interaction with objects in a field of regard (FOR) of a user, the FOR comprising a portion of the environment around the user that is capable of being perceived by the user via the AR system: receiving a selection of a target virtual object, wherein the target virtual object is associated with a first position in the FOR of the user and at least a portion of the target virtual object touches another object; displaying, to the user, a focus indicator associated with the target virtual object; receiving, from the user, an indication to detach the target virtual object from the other object; displaying, to the user based at least partly on the indication, the focus indicator at an updated position; determining whether the indication meets a threshold condition for detaching the target virtual object from the other object; in response to a determination that the threshold condition is met, displaying, to the user, the target virtual object at a second position associated with the updated position of the focus indicator; and in response to a determination that the threshold condition is not met, displaying, to the user, the target virtual object at the first position.

In a 41st aspect, the method of aspect 40, wherein receiving a selection of a target virtual object comprises at least one of the following: detecting a change in a pose of a user; or receiving an input from a user input device.

In a 42nd aspect, the method of any one of aspects 40-41, wherein the other object comprises at least one of: a physical object or a virtual object.

In a 43rd aspect, the method of aspect 42, wherein the other object comprises a wall or a table.

In a 44th aspect, the method of any one of aspects 40-43, wherein receiving an indication to detach the target virtual object comprises at least one of: detecting a movement of a user input device; detecting a hand gesture on the user input device; or detecting a change in a pose of the user.

In a 45th aspect, the method of any one of aspects 41-44, wherein the pose of the user comprises: a head pose, an eye pose, or a body pose.

In a 46th aspect, the method of any one of aspects 41-45, wherein the threshold condition for detaching the target virtual object from the other object comprises at least one of: a distance between the first position and the updated position is greater than or equal to a threshold distance; a speed for moving from the first position to the updated position is greater than or equal to a threshold speed; an acceleration for moving away from the first position is greater than or equal to a threshold acceleration; or a jerk for moving away from the first position is greater than or equal to a threshold jerk.

In a 47th aspect, the method of any one of aspects 41-46, wherein displaying, to the user, the target virtual object at the second position comprises: determining an orientation associated with the target virtual object before the target virtual object touches the other object; and displaying to the user the target virtual object with the orientation at the second position.

In a 48th aspect, the method of any one of the claims aspects 41-47, wherein displaying, to the user, the target virtual object at the second position comprises: determining an orientation associated with the target virtual object at the first position; and displaying to the user the target virtual object with the orientation at the second position.

In a 49th aspect, a method for detaching a target virtual object from another object in a three-dimensional (3D) environment of a user, the method comprising: under control of an augmented reality (AR) system comprising computer hardware, the AR system configured to permit user interaction with objects in the 3D environment of the user: receiving a selection of a target virtual object, wherein the target virtual object is attached to another object in the 3D environment at an initial position; displaying, to the user, a focus indicator associated with the target virtual object at the initial position; receiving, from the user, an indication to detach the target virtual object from the other object; displaying, to the user based at least partly on the indication, the focus indicator at an updated position; determining whether the indication meets a threshold condition for detaching the target virtual object from the other object; in response to a determination that the threshold condition is met, detaching the target virtual object based at least partly on the indication; and in response to a determination that the threshold condition is not met, displaying, to the user, the target virtual object at the initial position.

In a 50th aspect, the method of aspect 49, wherein receiving a selection of a target virtual object comprises at least one of the following: detecting a change in a pose of a user; or receiving an input from a user input device.

In a 51st aspect, the method of any one of aspects 49-50, wherein the other object comprises at least one of: a physical object or a virtual object.

In a 52nd aspect, the method of aspect 51, wherein the other object comprises a vertical surface or a horizontal surface.

In a 53rd aspect, the method of any one of aspects 49-52, wherein receiving an indication to detach the target virtual object from the other object comprises at least one of: detecting a movement of a user input device; detecting a hand gesture on the user input device; or detecting a change in a pose of the user.

In a 54th aspect, the method of any one of aspects 49-53, wherein the threshold condition for detaching the target virtual object from the other object comprises at least one of: a distance between the initial position and the updated position is greater than or equal to a threshold distance; a speed for moving from the initial position to the updated position is greater than or equal to a threshold speed; an acceleration for moving away from the initial position is greater than or equal to a threshold acceleration; or a jerk for moving away from the initial position is greater than or equal to a threshold jerk.

In a 55th aspect, the method of any one of aspects 49-54, wherein detaching the target virtual object is performed by simulating a physical force.

In a 56th aspect, the method of aspect 55, wherein the physical force comprises at least one of the following: gravity, magnetic attraction, friction, or elasticity.

In a 57th aspect, an augmented reality system comprising computer hardware, the augmented reality system is configured to perform any one of the methods in aspects 30-56.

In a 58th aspect, an augmented reality (AR) system for automatically repositioning a virtual object in a three-dimensional (3D) environment, the AR system comprising: an AR display configured to present virtual content in a 3D view; a hardware processor in communication with the AR display, the hardware processor programmed to: identify a target virtual object in the 3D environment of the user, wherein the target virtual object is assigned one vector representing a first location and a first orientation; receive an indication to attach the target virtual object to a destination object, wherein the destination object is assigned at least one vector representing a second location and a second orientation; calculate a trajectory between the target virtual object and the destination object based at least partly on the first location and the second location; move the target virtual object along the trajectory towards the destination object; track a current location of the target virtual object; calculate a distance between the target virtual object and the destination object based at least partly on the current location of the target virtual object and the second location; determine whether the distance of the target virtual object and the destination virtual object is less than a threshold distance; automatically attach the target virtual object to the destination object and orient the target virtual object to the second orientation in response to a comparison that the distance is less than or equal to the threshold distance; and render, by the AR display, the target virtual object at the second location with the second orientation where the target virtual object is overlaid on the destination object.

In a 59th aspect, the AR system of aspect 58, wherein the hardware processor is further programmed to: analyze affordances of at least one of the target virtual object, the destination object, or the environment; and to automatically orient the target virtual object, the hardware processor is programmed to rotate the target virtual object to align a first normal of the target virtual object with a second normal of the destination object.

In a 60th aspect, the AR system of aspect 59, wherein the affordances comprise at least one of: a function, an orientation, a type, a location, a shape, or a size.

In a 61st aspect, the AR system of any one of aspects 58-60, wherein to automatically attach the target virtual object, the hardware processor is programmed to: simulate an attractive force between the target virtual object and the destination object, wherein the attractive force comprises at least one of gravity, an elastic force, an adhesive force, or a magnetic attraction.

In a 62nd aspect, the AR system of any one of aspects 58-61, wherein to calculate the distance, the hardware processor is programmed to calculate a displacement between the current location of the target virtual object and the second location associated with the destination object.

In a 63rd aspect, the AR system of aspect 62, wherein the threshold distance is zero.

In a 64th aspect, the AR system of any one of aspects 58-63, wherein the indication to attach the target virtual object is determined from at least one of: an actuation of a user input device or a pose of a user.

In a 65th aspect, the AR system of aspect 64, wherein the hardware processor is further programmed to: assign a focus indicator to a current position of the user, wherein the current position of the user is determined based at least partly on the pose of the user or a position associated with the user input device.

In a 66th aspect, the AR system of any one of aspects 58-65, wherein the hardware processor is further programmed to: receive an indication to detach the target virtual object from the destination object, wherein the indication is associated with a change in the user's current position; determine whether a threshold condition for detaching the target virtual object is met based at least partly on the received indication; in response to a determination that the threshold condition is met: detach the target virtual object from the destination object; move the target virtual object from the second location associated with the destination object to a third location; and render the target virtual object at the third location.

In a 67th aspect, the AR system of aspect 66, wherein in response to the determination that the threshold condition is met, the hardware processor is further programmed to: retain the second orientation for the target virtual object while moving the target virtual object to the third location.

In a 68th aspect, the AR system of aspect 67, wherein the third location corresponds to a position of the focus indicator which corresponds to the current position of the user.

In a 69th aspect, the AR system of aspect 68, wherein the threshold condition for detaching the target virtual object from the other object comprises at least one of: a second distance between the second location where the target virtual object is attached to the destination object and the position of the focus indicator is greater than or equal to a second threshold distance; a speed for moving from the second location to the position of the focus indicator is greater than or equal to a threshold speed; an acceleration for moving away from the second location is greater than or equal to a threshold acceleration; or a jerk for moving away from the second location is greater than or equal to a threshold jerk.

In a 70th aspect, the AR system of aspect 69, wherein the hardware processor is programmed to simulate a physical force when detaching the target virtual object from the destination object, wherein the physical force comprises at least one of a friction or an elasticity.

In a 71st aspect, a method for automatically repositioning a virtual object in a three-dimensional (3D) environment, the method comprising: under control of an augmented reality (AR) system comprising computer hardware, the AR system configured to permit user interactions with objects in a 3D environment: identifying a target virtual object in the user's 3D environment, the target virtual object having a first position and a first orientation; receiving an indication to reposition the target virtual object with respect to a destination object; identifying parameters for repositioning the target virtual object; analyzing affordances associated with at least one of the 3D environment, the target virtual object, and the destination object; calculating values of the parameters for repositioning the target virtual object based on the affordances; determining a second position and a second orientation for the target virtual object and a movement of the target virtual object based on the values of the parameters for repositioning the target virtual object; and rendering the target virtual object at the second position and the second orientation and the movement of the target virtual object for reaching the second position and the second orientation from the first position and the first orientation.

In a 72nd aspect, the method of aspect 71, wherein repositioning the target object comprises at least one of attaching the target object to the destination object, reorienting the target object, or detaching the target object from the destination object.

In a 73rd aspect, the method of any one of aspects 71-72, the method of claim 14, wherein the destination object is a physical object.

In a 74th aspect, the method of any one of aspects 71-73, further comprising determining whether the indication to reposition the target virtual object meets a threshold condition; and performing said calculating, determining, and rendering in response to a determination that the indication meets the threshold condition.

In a 75th aspect, the method of any one of aspect 74, wherein the threshold condition comprises a distance between the target virtual object and the destination object.

In a 76th aspect, the method of any one of aspects 71-75, wherein one or more physical attributes is assigned to the target virtual object, and the movement of the target virtual object is determined by simulating interactions of the target virtual object, the destination object, and the environment based on the physical attributes of the target virtual object.

In a 77th aspect, the method of aspect 76, wherein the one or more physical attributes assigned to the target virtual object comprises at least one of a mass, a size, a density, a phase, a hardness, an elasticity, or an electromagnetic attribute.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system comprising:

a hardware computer processor; and a non-transitory computer readable medium having software instructions stored thereon, the software instructions executable by the hardware computer processor to cause the AR system to perform operations comprising:

render a virtual environment to a user of the AR system;

present a virtual menu of items to the user of the AR system;

generate a focus indicator comprising a graphical representation of a cursor, virtual cone, or virtual ray;

display the focus indicator at a location in the virtual environment of the user associated with a current pose of the user;

receive a selection of an item by the user from the virtual menu of items based on a positioning of the focus indicator by the user;

automatically place the selected item at a location in the virtual environment of the user based at least in part on:

affordances of the selected item and affordances of objects, associated with inanimate physical objects, in the virtual environment of the user, wherein automatically placing the selected item at the location in the virtual environment of the user includes applying a virtual force to the selected item based on the affordances of the selected item and the affordances of the objects in the virtual environment of the user, and wherein the virtual force replicates at least one of a spring force, a gravitational force, an adhesive force, or an electromagnetic force and is at least partially dependent on a user preference associated with an orientation speed, wherein the applying the virtual force to the selected item based on the affordances of the selected item and the affordances of the object in the virtual environment of the user includes applying a repulsive force when the affordances of the selected item and the affordances of the object in the virtual environment of the user indicate a functional incompatibility for use or attachment at the location, such that placing the selected item at the location would prevent an intended use of the selected item or the object and wherein, upon determining that the placing of the selected item at the location is suitable, the automatically placing the selected item at the location in the virtual environment of the user further includes:

calculating a distance between an initial location of the selected item from the virtual menu of items and the location, determining whether the distance between distance is less than a first threshold distance, and rendering, when the distance is less than the first threshold distance, an orientation of the selected item to align one or more objects at the location by automatically orienting the selected item to cause a surface normal of the selected item to face the AR system, the surface normal being defined by the affordances of the selected item;

and automatically orienting the selected item to cause a surface normal of the selected item to be perpendicular to a surface of the location or parallel to a normal of the location.

2. The AR system of claim 1, wherein the software instructions are further configured to, upon selection, copy the selected item from the virtual menu of items into a virtual clipboard.

3. The AR system of claim 1, wherein the software instructions are further configured to determine the location based on at least one of: an actuation of a user input device or a pose of a user.

4. The AR system of claim 1, wherein the software instructions are further configured to determine the location based on receiving an indication from the user to place the selected item at the location that includes: identifying, using a pose sensor, a change in a pose of the user; identifying the location based at least partly on the pose of the user; and receiving a confirmation from the user to place the selected item at the location.

5. The AR system of claim 4, wherein the confirmation comprises at least one of a change in the pose of the user or a hand gesture on a user input device.

6. The AR system of claim 1, wherein the location is a physical object with an at least partially planar surface within the environment of the user, and wherein the applying the repulsive force occurs when the affordances of the selected item and the affordances of the object in the virtual environment of the user indicate that the placing of the selected item at the location is unsuitable due to the object in the virtual environment of the user already occupying the location.

7. The AR system of claim 6, wherein the physical object comprises a wall or a table.

8. The AR system of claim 1, wherein the location is a virtual object.

9. The AR system of claim 1, wherein the affordances of the selected item are associated with one or more of the following: a function, an orientation, a type, a location, a shape, a size, or an environment of the selected item.

10. The AR system of claim 1, wherein the affordances of the objects in the virtual environment are associated with one or more of the following: a function, an orientation, a type, a location, a shape, a size, or an environment of the selected item.

11. The AR system of claim 1, wherein one or more physical attributes is assigned to the selected item, and the placement of the selected item is determined by simulating interactions of the selected item, the location, and the virtual environment based on the physical attributes of the selected item.

12. The AR system of claim 11, wherein the one or more physical attributes assigned to the selected item comprises at least one of a mass, a size, a density, a phase, a hardness, an elasticity, or an electromagnetic attribute.

13. The AR system of claim 1, wherein automatically placing the selected item at the location in the virtual environment of the user further includes applying a virtual force to the selected item further based at least in part on affordances of the virtual environment, wherein the virtual environment includes at least one of gravity or air resistance.

14. The AR system of claim 1, wherein the virtual force on the selected item based on the affordances of the selected item defines at least one of an amount, speed, or acceleration of movement of the selected item to the location.

15. The AR system of claim 1, wherein the repulsive force occurs independently of geometric overlap detection.

16. The AR system of claim 1, wherein the applying the repulsive force comprises determining that the selected item and the object are associated with incompatible affordance classes, including at least one of: support affordances, attachment affordances, display affordances, containment affordances, or interaction affordances.

17. The AR system of claim 1, wherein the virtual force is modulated in magnitude or rate based on a user preference associated with an orientation speed.

18. The AR system of claim 1, wherein the automatically orienting the selected item is performed only after determining that the distance between the selected item and the location is less than a threshold distance.

19. The AR system of claim 1, wherein the automatically orienting the selected item includes a first orientation adjustment prior to attachment to the location and a second orientation adjustment after attachment, each determined based on affordances.

20. The AR system of claim 1, wherein automatically orienting the selected item includes detecting when a functional surface is facing away from the AR system and reversing an orientation axis in response.

* * * * *